CHECKING CIRCUIT

Filed June 4, 1954 10 Sheets-Sheet 1

*INVENTORS*
WILLIAM JAMES DEERHAKE
BYRON LUTHER HAVENS
KENNETH EUGENE SCHREINER
BY Wesley De Bruin
ATTORNEY INVENTORS
WILLIAM JAMES DEERHAKE
BYRON LUTHER HAVENS
KENNETH EUGENE SCHREINER
BY Wesley De Bruin
ATTORNEY INVENTORS
WILLIAM JAMES DEERHAKE
BYRON LUTHER HAVENS
KENNETH EUGENE SCHREINER
BY Wesley De Bruin
ATTORNEY

CHECKING CIRCUIT

Filed June 4, 1954 10 Sheets-Sheet 4

*INVENTORS*
WILLIAM JAMES DEERHAKE
BYRON LUTHER HAVENS
KENNETH EUGENE SCHREINER
BY Wesley De Bruin
ATTORNEY

*INVENTORS*
WILLIAM JAMES DEERHAKE
BYRON LUTHER HAVENS
KENNETH EUGENE SCHREINER
BY Wesley DeBruin
ATTORNEY

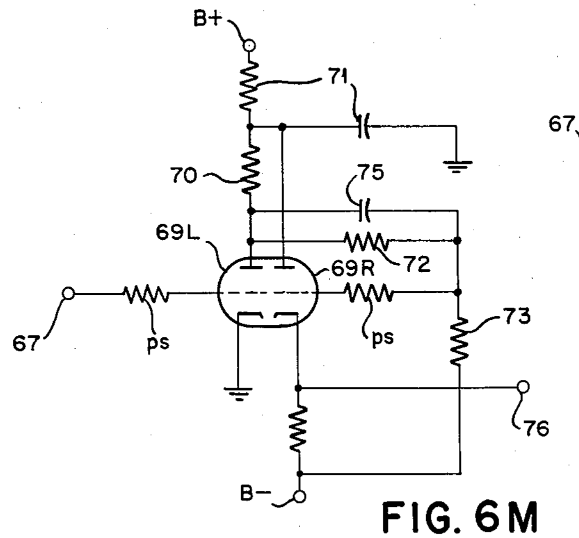
FIG. 6M
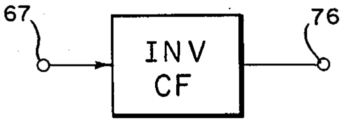
FIG. 6N
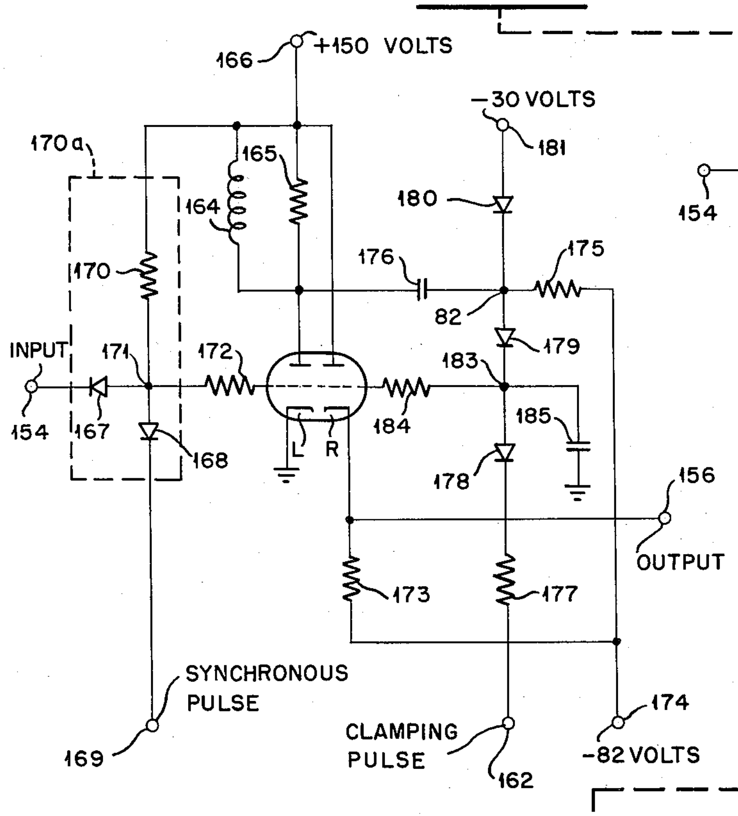
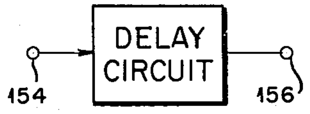
FIG. 6Y
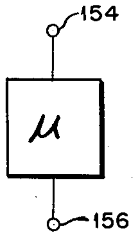
FIG. 6Z
FIG. 6W
*INVENTORS*
WILLIAM JAMES DEERHAKE
BYRON LUTHER HAVENS
KENNETH EUGENE SCHREINER
BY *Wesley De Bruin*
ATTORNEY

*INVENTORS*
WILLIAM JAMES DEERHAKE
BYRON LUTHER HAVENS
KENNETH EUGENE SCHREINER
BY Wesley DeBruin
ATTORNEY INVENTORS
WILLIAM JAMES DEERHAKE
BYRON LUTHER HAVENS
KENNETH EUGENE SCHREINER
BY Wesley De Bruin
ATTORNEY INVENTORS
WILLIAM JAMES DEERHAKE
BYRON LUTHER HAVENS
KENNETH EUGENE SCHREINER
BY Wesley De Bruin
ATTORNEY

*INVENTORS*
WILLIAM JAMES DEERHAKE
BYRON LUTHER HAVENS
KENNETH EUGENE SCHREINER
BY Wesley De Bruin
ATTORNEY 2,970,764

CHECKING CIRCUIT

William J. Deerhake, Dumont, Byron L. Havens, Closter, and Kenneth E. Schreiner, Harrington Park, N.J., assignors to International Business Machines Corporation, New York, N.Y., a corporation of New York Filed June 4, 1954, Ser. No. 434,548

20 Claims. (Cl. 235—153)

This invention relates to a checking circuit for use in a high speed calculator.

Calculators of the type wherein the novel checking circuit herein disclosed would find application receive information, commonly referred to as information or instruction words, in the pure binary-decimal system. The word is usually a multi-digit word having four binary-decimal positions for each decimal position, i.e., each decimal position has binary-decimal digit positions 1, 2, 4 and 8. The decimal value represented in the binary-decimal notation within each decimal position is equal to or less than 9.

Each word consisting of a plurality of decimal digits has an indicator. The indicator, i.e., the indicated bit count, bears a definite mathematical relationship to the information or instruction word and is written in coded notation.

The checking circuit has a plurality of terminals (i.e., data line terminals) at which a succession of words and their respective indicators simultaneously appear when the calculator is in operation. The checking circuit accepts each word and its indicator and first of all determines whether a value greater than 9 is present in any decimal position of the word. If a value greater than 9 is present in any decimal position of the word, the checking circuit renders an electrical manifestation of error. Secondly, the checking circuit determines whether the indicator and the word are in accord, i.e., whether an error exists. If an error exists it may be due to the transposition of one or more binary-decimal digits, the presence of spurious binary-decimal digits, or the dropping of binary-decimal digits. The error may be in either the word or the indicator.

For purposes of clarity and consistency a number of definitions of terminology and symbols will be set forth:

In the binary notation only two digits are employed, i.e., 0 and 1. The decimal digit 0 is represented by binary digit 0 and the decimal digit 1 is represented by binary digit 1. These binary digits are referred to as bits. The digital positions or orders in a binary number, reading from right to left, correspond in value to $2^0$, $2^1$, $2^2$, $2^3$, $2^4$, etc. or decimal digits 1, 2, 4, 8, 16 etc. respectively. For example, binary number 1001 represents decimal digit 9 which is determined by the addition of decimal digits 1 and 8 indicated by a binary 1 in the extreme right and the left binary positions respectively. Hence, by using binary bits or pulses in groups of four wherein a pulse represents a binary 1 and the absence of a pulse represents a binary 0 any decimal digit from 0–9 inclusive may be written in the pure binary notation.

The system of representing decimal numbers, digit for digit, in the pure binary notation is referred to herein as the binary-decimal system. The four consecutive binary orders, reading from right to left, represent the decimal digits 1, 2, 4 and 8 for the units decimal order and are accordingly referred to as the 1 bit, 2 bit, 4 bit and 8 bit, respectively. It follows that the four binary orders of the tens decimal order represent the decimal digits 10, 20, 40 and 80 respectively. Likewise, in subsequent decimal orders, for example, the four respective binary orders of the hundreds decimal order represent the decimal digits 100, 200, 400 and 800 respectively.

As an example, 459 will be represented in the binary-decimal system by 0100, 0101, 1001. The four binary bits at the right represent the decimal digit 9 of the units order, the next four bits to the left represent the decimal digit 5 of the tens order, and the four bits at the extreme left represent the decimal digit 4 of the hundreds order.

Any decimal number from 0–15 inclusive can be represented by a group of four binary bits. However, in the binary-decimal system, only the decimal digits (0–9 inclusive) are represented by each group of four binary bits.

Various circuits used herein or particular points within the circuits are frequently referred to as UP or DOWN. UP means that the voltage present at the particular point or at the output of the circuit designated is positive with respect to ground. DOWN means that the voltage present at the particular point or at the output of the circuit designated is negative with respect to ground. If the control grid of a vacuum tube is referred to as DOWN, it means that the voltage at that control grid is below the cutoff value for the vacuum tube.

Numerous coincidence circuits are employed herein. An AND circuit refers to a circuit which is operable to produce a positive voltage at its output terminal only when all of the input terminals thereof have a positive voltage applied thereto simultaneously. An OR circuit refers to a circuit operable to produce a positive voltage at its output terminal when only one or a plurality of the input terminals thereof has a positive voltage applied thereto.

When a terminal is referred to as being UP the presence of a binary 1 is indicated. Correspondingly, when a terminal is represented as DOWN the absence of a binary 1 is indicated, i.e., the presence of a binary 0.

*The actual bit count.*—The actual bit count of a word is determined by counting the number of binary 1's contained within a word expressed in binary-decimal notation. For example, consider the decimal quantity 63,421. Expressed in binary-decimal notation this would be represented as follows: 0110, 0011, 0100, 0010, 0001. It will be noted that this binary-decimal expression contains seven binary 1's. Therefore by definition, the actual bit count of the quantity 63,421 expressed in binary-decimal notation is 7.

*The bit count modulo 4.*—The bit count modulo 4 of a word expressed in binary-decimal notation is determined by taking the modulo 4 of the actual bit count. Referring to the previously recited example wherein the quantity 63,421 was expressed in binary-decimal notation, it will be recalled that the actual bit count was 7. Hence, the modulo 4 of 7 is 3. Therefore the bit count modulo 4 of the quantity 63,421 expressed in binary-decimal notation is 3.

*The indicated bit count.*—The indicated bit count is defined as the 3's complement of the bit count modulo 4. Again referring to the example wherein decimal quantity 63,421 was represented in binary-decimal notation, it will be recalled that the actual bit count was 7 and the bit count modulo 4 was 3. Therefore, the indicated bit count would be 0, i.e., 3 minus the bit count modulo 4. At this point it is to be noted that the indicated bit count and the indicator are one and the same and hereinafter the terms will be used interchangeably.

*Number modulo 4 of a decimal number.*—The number modulo 4 of a decimal number is the decimal number divided by 4 and the remainder noted. The quotient is discarded and the remainder becomes the number modulo 4 of the original decimal number. It is to be observed that in the modulo 4 system the number modulo 4 of a decimal number can only have the values 0, 1, 2 or 3, since the digit 4 has the same value as 0. By way of example, the number modulo 4 of the decimal number 63,421 is 1. At this point it is to be noted that there is no consistent relationship between the bit count modulo 4 and the number modulo 4 of a decimal number itself. By way of example, the decimal number 25 written in binary-decimal form is: 0010, 0101. The bit count modulo 4 of this binary-decimal number is 3 since there are three binary 1's present and 3 divided by 4 equals 0 plus a remainder of 3. Hence, the bit count modulo 4 of 25 is 3. The number modulo 4 of the decimal number 25 is 1 since 25 divided by 4 equals 6 and a remainder of 1. The remainder of 1 being the modulo 4 of the decimal number 25. The method of checking errors using the modulo 4 system, to be described hereinafter in detail, is concerned only with the binary bits (binary 1's) which comprise a binary-decimal number. Thus where two different binary-decimal numbers have the same number of binary 1's present, the bit count modulo 4's of the two binary-decimal numbers are identical. By way of example, the decimal number 531 is represented in binary-decimal form as follows: 0101, 0011, 0001 and has a bit count modulo 4 of 1. The decimal number 591 is written in binary-decimal form as follows: 0101, 1001, 0001 and has a bit count modulo 4 of 1. It is seen from the above that two different decimal numbers have the same bit count modulo 4 since they have the same actual bit count. It follows that the indicator of the decimal number 531 would be the same as the indicator of the decimal number 591.

Keeping the above discussion in mind, and referring to the binary bits of a binary-decimal number (i.e., word) the method of checking errors using the modulo 4 system can be arithmetically described as follows: If the indicated bit count (i.e., indicator) is added to the bit count modulo 4, to which the decimal digit 1 is also added the sum will be 4 which in the modulo 4 system is equal to 0. As an example, consider that the actual bit count of a word is 29, i.e., there are twenty-nine binary 1's present in the binary-decimal notation of said word. The bit count modulo 4 (i.e., 29 divided by 4) is 1 and the indicated bit count is 2 (i.e., 3 minus 1). If the decimal digit one (1) is then added to the bit count modulo 4 (1) and the indicated bit count (2) it is evident that the sum is 4 as previously stated. If the sum of these digits is other than 4 it is apparent that an error has been made.

The data line terminals appearing at the top of Figs. 2 and 3 are divided into seventeen decimal positions, decimal position 1 appearing at the extreme right and having terminals DLT1–1, DLT1–2, DLT1–4 and DLT1–8. Decimal positions 2–16 are in order to the left of decimal position 1 and have corresponding terminals, i.e., decimal position 2 has terminals DLT2–1, DLT2–2, DLT2–4 and DLT2–8. The terminals of decimal positions 3–16 are correspondingly designated. The 17th decimal position which appears at the extreme upper left in Fig. 1 has only two terminals respectively labelled DLT17–1 and DLT17–2.

The operation of the novel checking circuit herein disclosed may be briefly described as follows: The indicator or indicated bit count that accompanies a word is impressed upon the two terminals of decimal position 17. The word is impressed upon the terminals of decimal positions 1–16 at the same time that the word's indicator is impressed on the terminals of decimal position 17. A word and its indicator are always associated together as a unit, and both are applied to the terminals of decimal positions 1–16 by external circuitry of an electronic calculator as shown, for example, in application Serial No. 465,076 filed October 27, 1954 by Deerhake et al., now Patent No. 2,826,359, and also in application Serial No. 547,981 filed November 21, 1955 by Havens et al. The indicator associated with a particular word is initially computed by external circuitry prior to applying the word to the calculator and to the circuit of the present invention. Thus, the novel circuit always receives a word and its indicator simultaneously. The circuitry appearing below the data line terminals in Figs. 2, 3, 4 and 5 effectively calculates the bit count modulo 4 of the binary bits (i.e., binary 1's) present in the word of information impressed on the terminals of decimal positions 1–16. Within the circuitry of Figs. 2, 3, 4 and 5 the bit count modulo 4 of the word is added to the indicator of said word forming a first sum to which the decimal 1 is added. This results in a sum of 4 if the word and its indicator are in accord. As will appear clearly from the detailed discussion that follows, when a word and its indicator are in accord terminal E620 manifests this determination by being in a DOWN condition.

The primary object of this invention is the provision of electronic circuit means capable of rapidly checking the accuracy of a word expressed in binary or binary-decimal notation.

A second object of this invention is the provision of electronic circuit means that will detect the presence of a decimal value greater than 9 existing within any decimal position of a multi-decimal position word expressed in binary-decimal notation.

A further object of the present invention is an electronic checking circuit that is fast, accurate and reliable in operation.

A still further object of the present invention is a method of checking data expressed in coded form.

A still further object of the present invention is the provision of novel circuit means for determining when a decimal value greater than 9 exists within any decimal position of a multi-decimal position word expressed in coded notation.

A yet further object of the present invention is the provision of electronic circuit means including only coincidence circuit means, for determining the accuracy of a word expressed in coded notation.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a diagram showing how Figs. 2, 3, 4 and 5 are to be joined to disclose the complete circuit diagram of the novel checking circuit;

Fig. 2 discloses a portion of the novel checking circuit and is to be joined with Figs. 3, 4 and 5 in the manner shown in Fig. 1;

Fig. 3 discloses a portion of the novel checking circuit and is to be joined with Figs. 2, 4 and 5 in the manner shown in Fig. 1;

Fig. 4 discloses a portion of the novel checking circuit and is to be joined with Figs. 2, 3 and 5 in the manner shown in Fig. 1;

Fig. 5 discloses a portion of the novel checking circuit and is to be joined with Figs. 2, 3 and 4 in the manner shown in Fig. 1;

Figure 2:
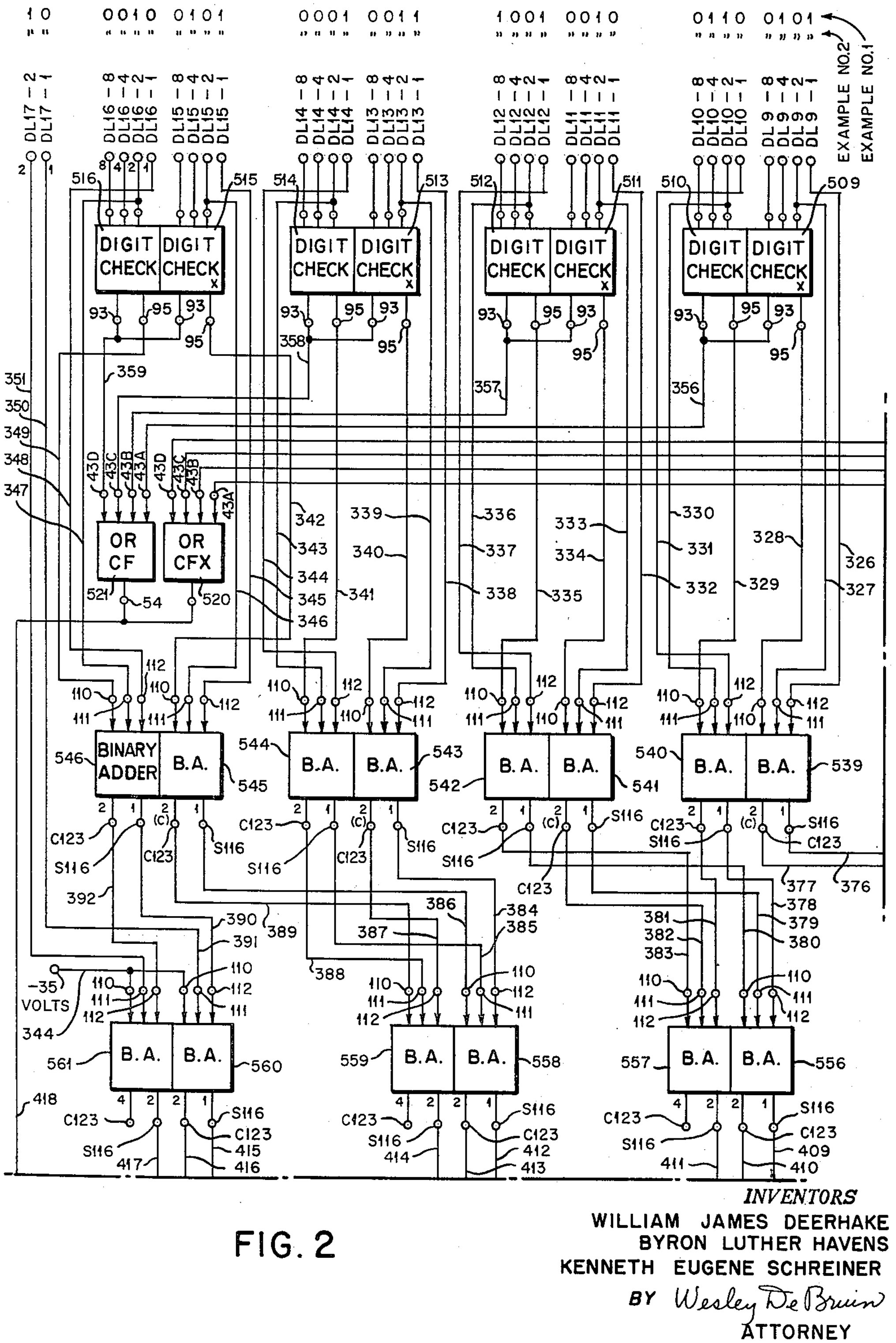
Figure 3:
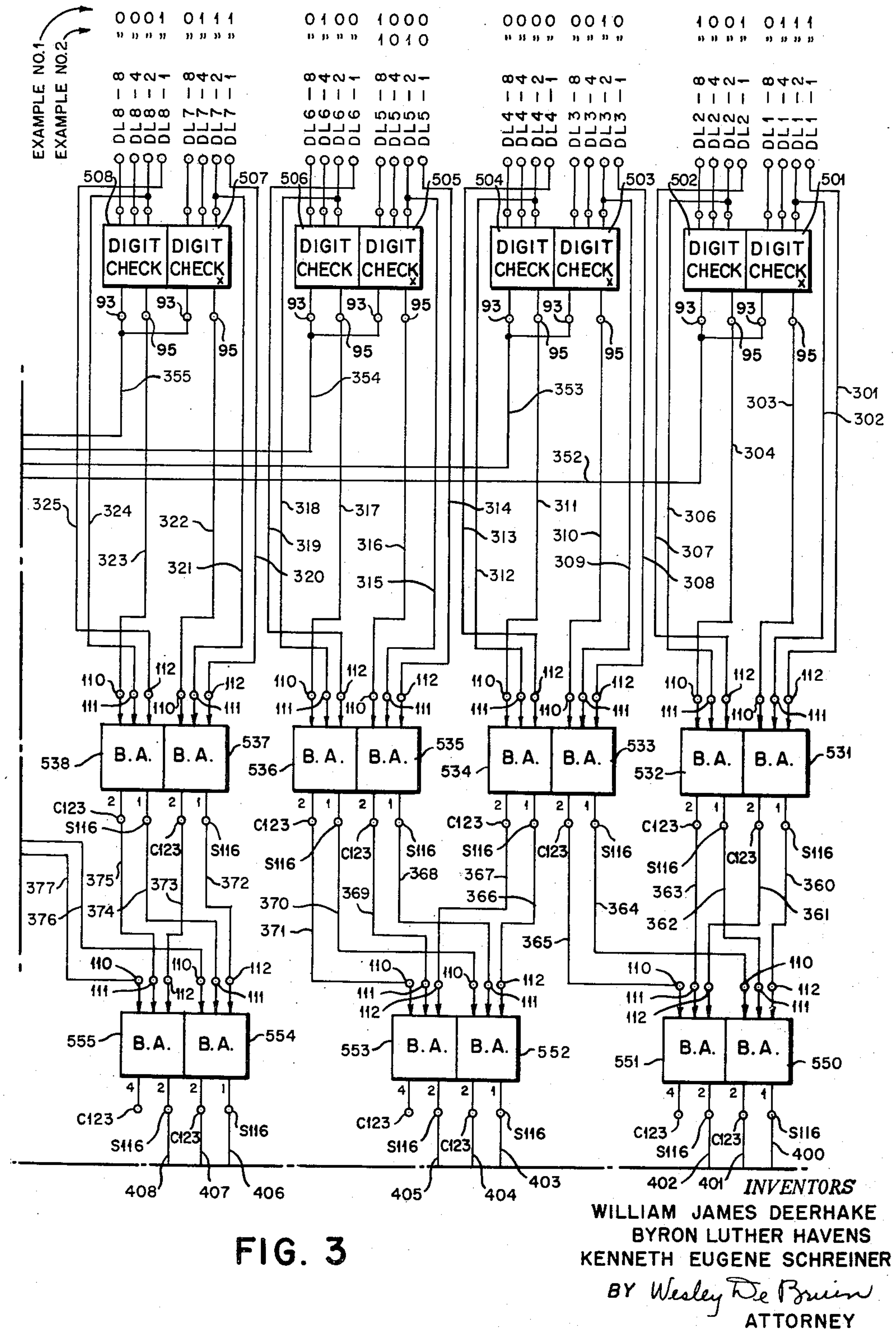
Figures 6A, 6B, 6C, 6D, 6E, 6F, 6G, 6H:
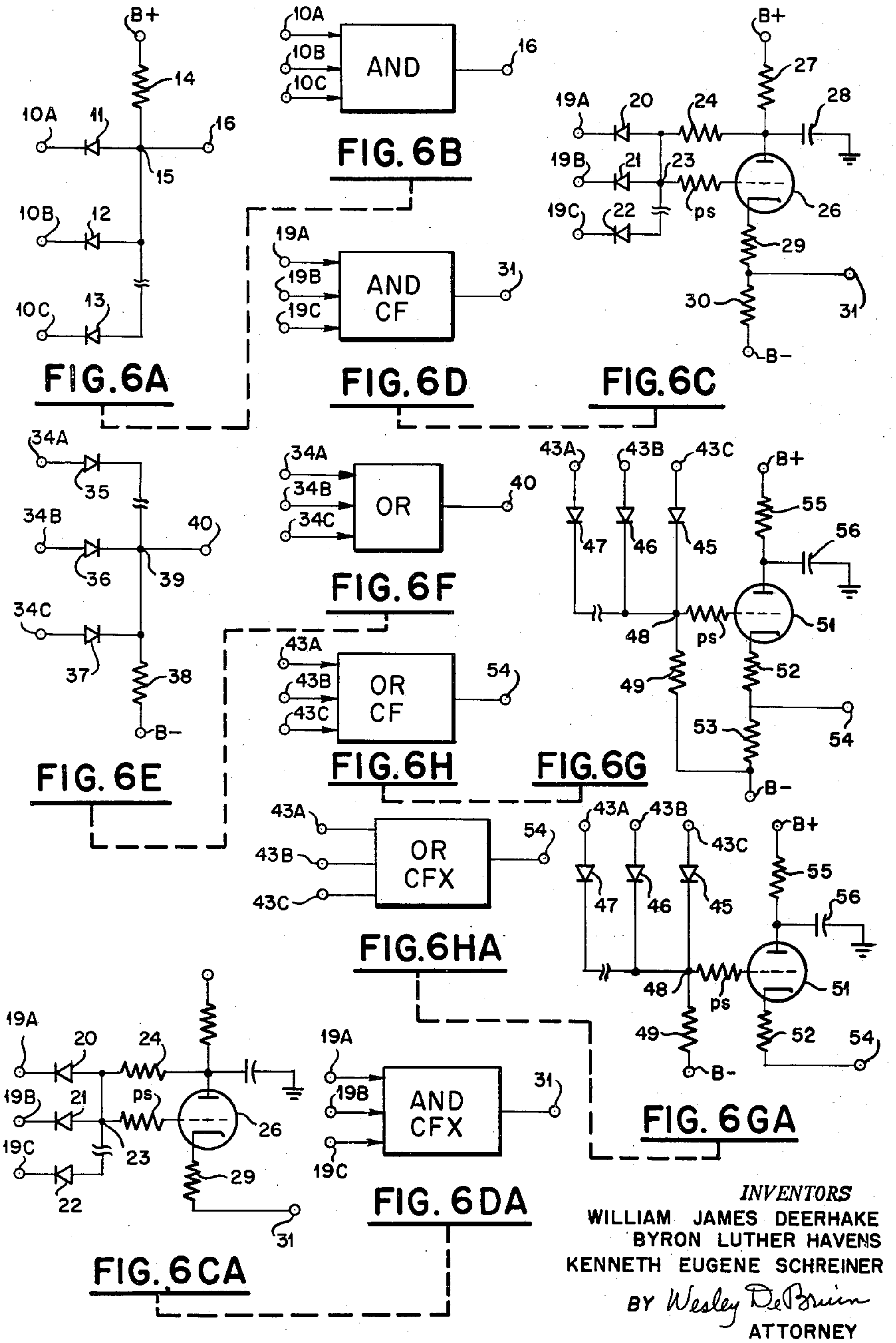
Fig. 6A is a schematic circuit diagram of a diode AND circuit.
Fig. 6B is a block diagram representation of the diode AND circuit of Fig. 6A.
Fig. 6C is a schematic circuit diagram of a diode cathode follower type AND circuit.
Figures 6S, 6T, 6U, 6V:
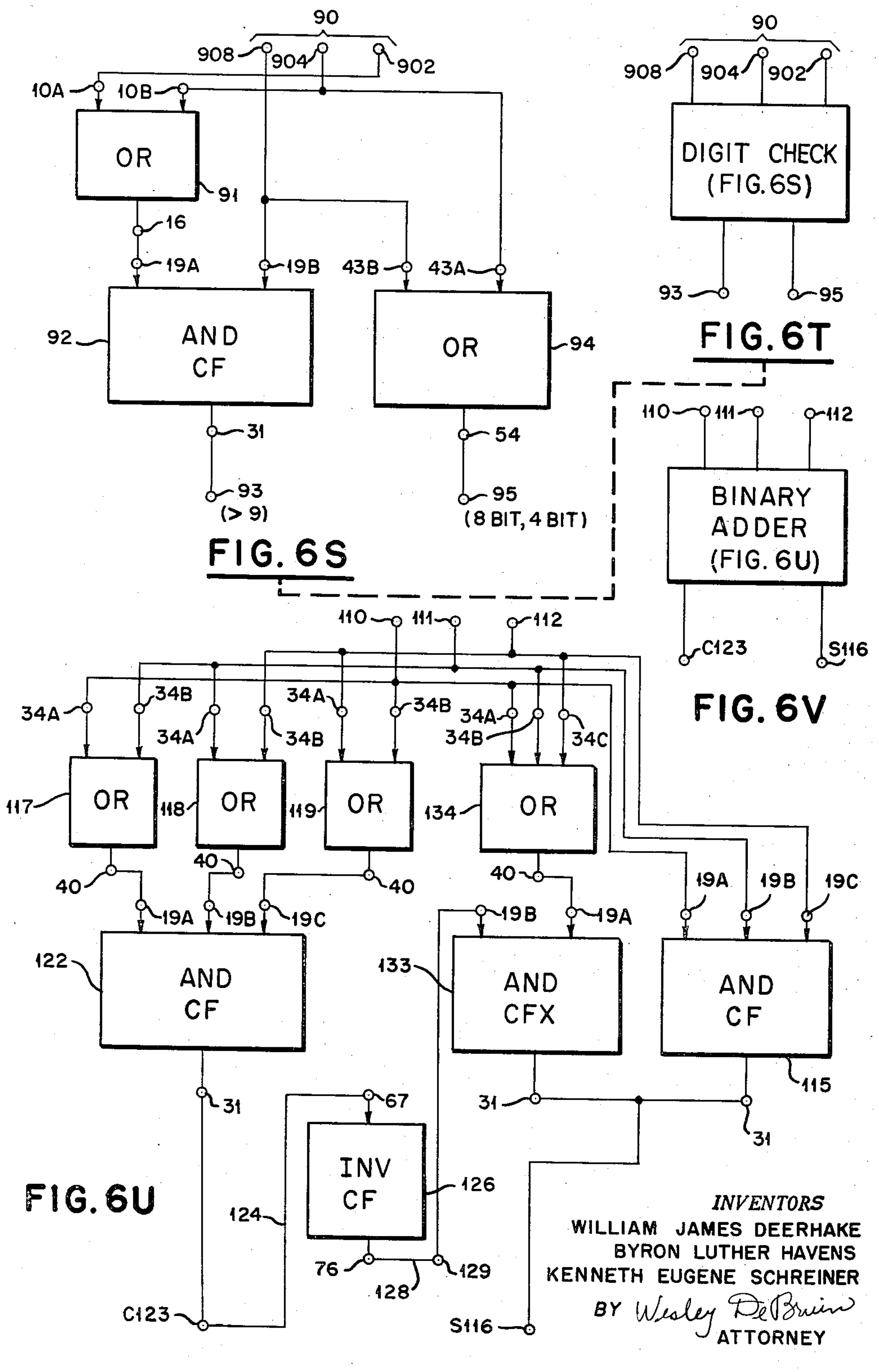
Figures 6S, 6T, 6U, 6V:
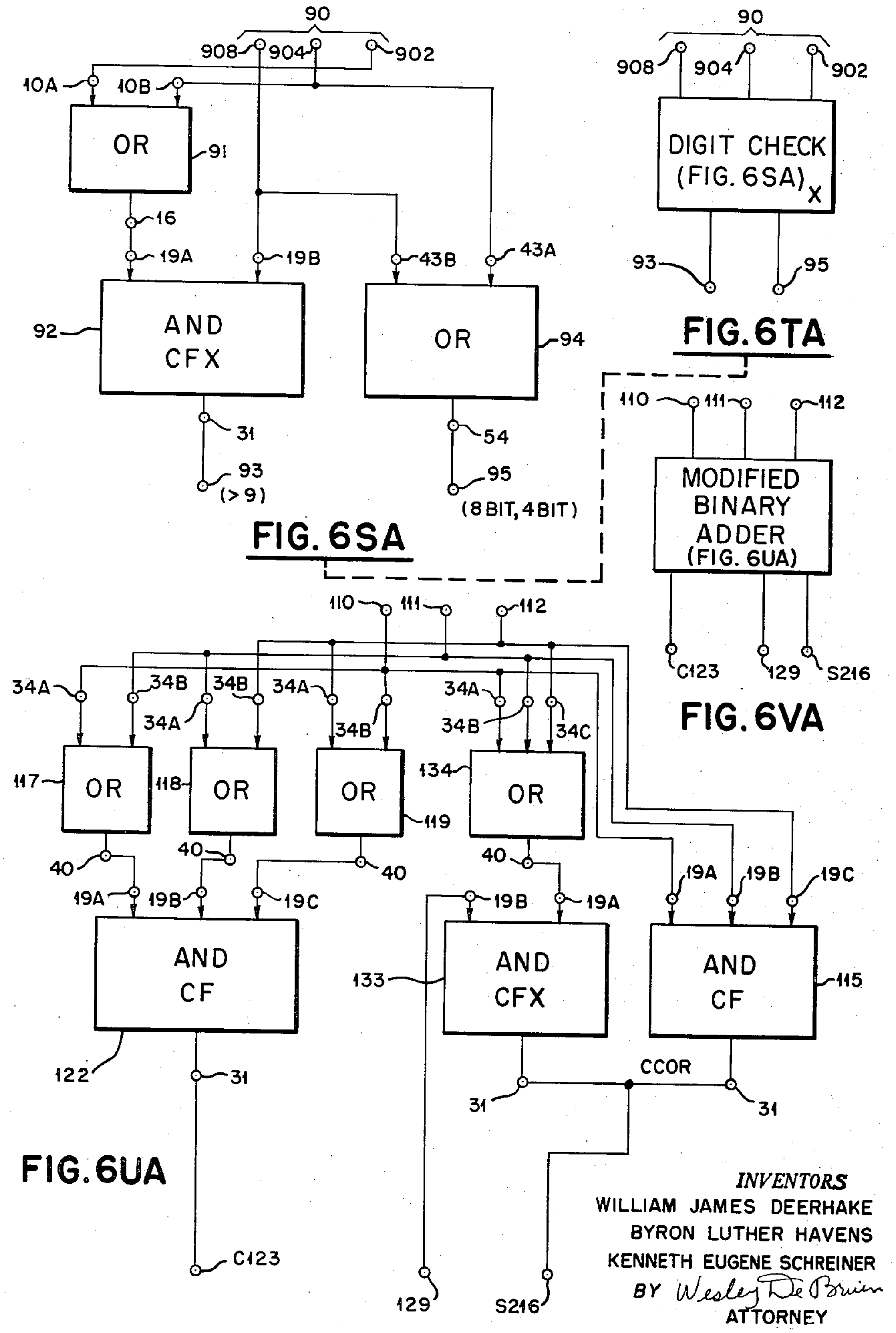
Figure 7:
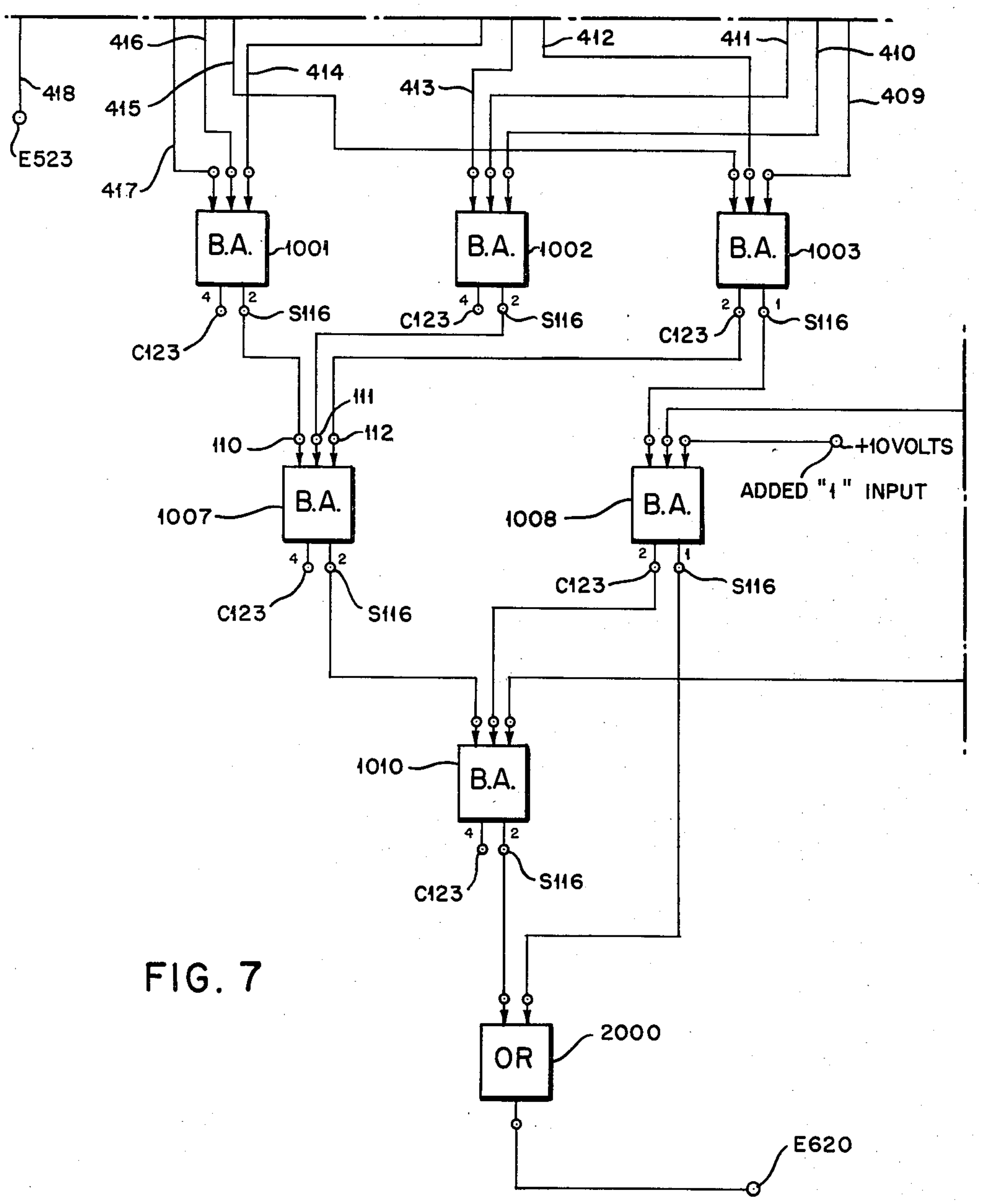
Figure 8:
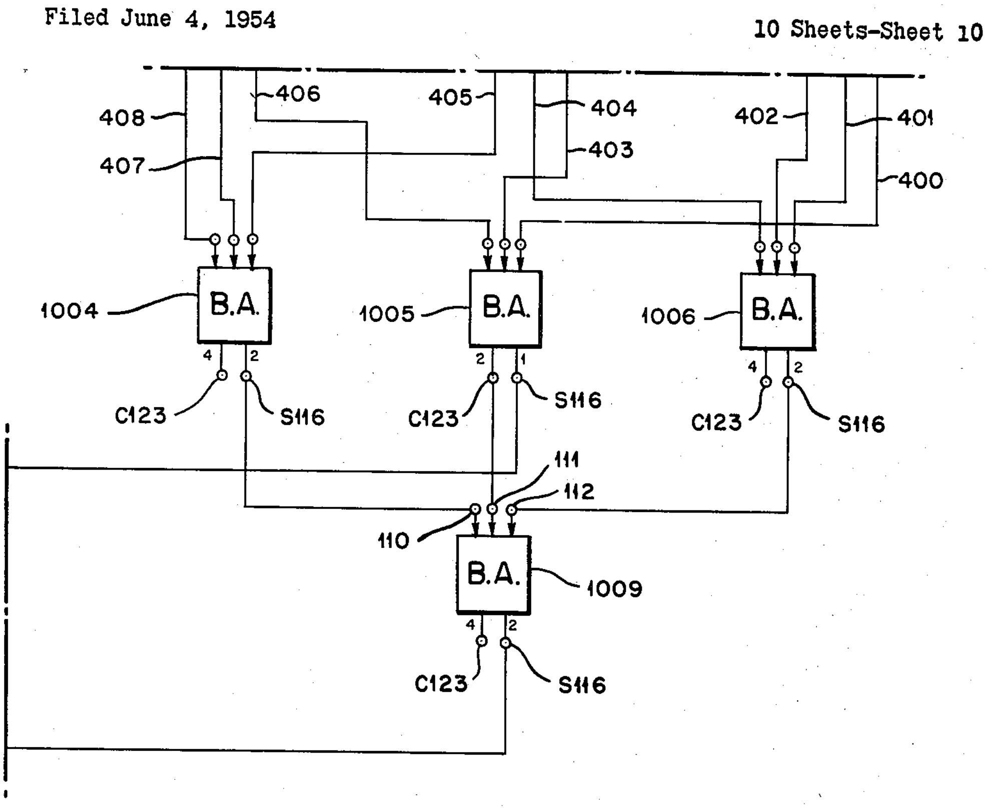
Figure 9:
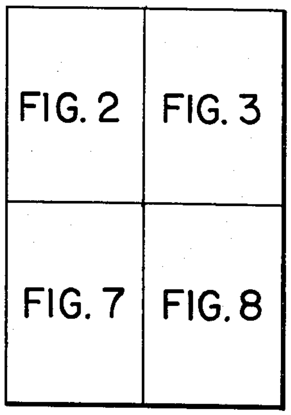

Fig. 6CA is a schematic circuit diagram of a diode cathode follower type AND circuit;

Fig. 6D is a block diagram representation of the diode cathode follower type AND circuit of Fig. 6C;

Fig. 6DA is a block diagram representation of the diode cathode follower type AND circuit of Fig. 6CA;

Fig. 6E is a schematic circuit diagram of a diode OR circuit;

Fig. 6F is a block diagram representation of the diode OR circuit of Fig. 6E;

Fig. 6G is a schematic circuit diagram of a diode cathode follower type OR circuit;

Fig. 6GA is a schematic circuit diagram of a diode cathode follower type OR circuit;

Fig. 6H is a block diagram representation of the diode cathode follower type OR circuit of Fig. 6G;

Fig. 6HA is a block diagram representation of the diode cathode follower type OR circuit of Fig. 6H;

Fig. 6M is a schematic circuit diagram of an inverter circuit;

Fig. 6N is a block diagram representation of the inverter circuit of Fig. 6M;

Fig. 6S is a schematic circuit diagram of a digit check circuit;

Fig. 6SA is a schematic circuit diagram of a digit check circuit;

Fig. 6T is a block diagram representation of the digit check circuit of Fig. 6S;

Fig. 6TA is a block diagram representation of the digit check circuit of Fig. 6SA;

Fig. 6U is a schematic circuit diagram of a binary adder;

Fig. 6UA is a schematic circuit diagram of a MODIFIED binary adder;

Fig. 6V is a block diagram representation of the binary adder of Fig. 6U;

Fig. 6VA is a block diagram representation of the MODIFIED binary adder of Fig. 6UA;

Fig. 6W is a schematic circuit diagram of a delay circuit;

Fig. 6Y is a block diagram representation of the delay circuit of Fig. 6W;

Fig. 6Z is an alternative block diagram representation of the delay circuit of Fig. 6W;

Fig. 7 is a diagram showing how Figs. 2, 3, 8 and 9 are to be joined to disclose an alternative embodiment of a complete circuit diagram of the novel checking circuit;

Fig. 8 discloses a portion of the alternative embodiment of the novel checking circuit and is to be joined with Figs. 2, 3 and 9 in the manner shown in Fig. 7; and Fig. 9 discloses a portion of the alternative embodiment of the novel checking circuit and is to be joined with Figs. 2, 3 and 8 in the manner shown in Fig. 7.

*The AND circuit of Figs. 6A and 6B.*—Referring to Fig. 6A, a schematic circuit diagram of a diode AND circuit is illustrated. The diode AND circuit comprises the input terminals 10A, 10B and 10C, the diodes 11, 12 and 13, the pull-up resistor 14 and the output terminal 16. It will be noted that terminal 10A is connected to the cathode of diode 11, that terminal 10B is connected to the cathode of diode 12 and that terminal 10C is connected to the cathode of diode 13. The anodes of diodes 11, 12 and 13 are commonly connected at juncture 15. Also connected to juncture 15 is output terminal 16 and one side of pull-up resistor 14. At this point it is to be appreciated that a greater or lesser number of diodes can be used. Pull-up resistor 14 has connected to its other end a positive voltage B+. Briefly, the AND circuit of Fig. 6A functions as follows: If one or more of the input terminals, namely, 10A, 10B and 10C are DOWN (i.e., at approximately −30 volts) the juncture 15 and the output terminal 16 are DOWN. When all of the input terminals are UP simultaneously, the juncture 15 and the output terminal 16 are UP.

*The AND circuit of Figs. 6C and 6D.*—Fig. 6C represents an AND circuit including input terminals 19A, 19B and 19C, the diodes 20, 21 and 22, the pull-up resistor 24 and the cathode follower tube 26 and its associated circuitry. Input terminal 19A is connected to the cathode of diode 20, input terminal 19B is connected to the cathode of diode 21 and input terminal 19C is connected to the cathode of diode 22. It is to be understood that a greater or lesser number of diodes can be employed. The anodes of diodes 20, 21 and 22 are connected together to one side of pull-up resistor 24 and through parasitic suppressing resistor PS to the grid of triode tube 26. The other side of pull-up resistor 24 is connected to the plate of triode 26. It will be noted that the plate of triode 26 is connected through decoupling resistor 27 to a positive voltage B+ and through capacitor 28 to ground. The resistor 27 and capacitor 28 together constitute a decoupling circuit between the positive voltage B+ and the anode of the cathode follower. The cathode of the cathode follower tube, namely, triode 26, is connected through resistors 29 and 30 to the negative terminal of the B supply. It will be seen that output terminal 31 is connected to the juncture of resistors 29 and 30, resistors 29 and 30 serving as a voltage dividing network which places the output terminal 31 at the proper potential. Briefly, the AND circuit of Fig. 6C functions as follows: if all of the input terminals, namely, 19A, 19B and 19C are UP simultaneously, then the grid of cathode follower tube, triode 26, is UP. This renders triode 26 fully conductive and results in output terminal 31 being UP. When one or more of the input terminals, namely, 19A, 19B and 19C are DOWN, i.e., at approximately −30 volts, the output terminal 31 is DOWN. It will be appreciated that the AND circuit of Fig. 6A and the AND circuit of Fig. 6C are functionally similar in operation and can be used interchangeably unless a circuit requirement dictates the necessity of isolating the input terminals from the output terminals. The block diagram Fig. 6B and the block diagram Fig. 6D are distinguishable by the letters CF which indicates that the AND circuit of Fig. 6D is of the cathode follower type.

*The OR circuit of Figs. 6E and 6F.*—Referring to Fig. 6E, a schematic diagram of a simple diode OR circuit is illustrated. Such a circuit comprises the input terminals 34A, 34B and 34C, the diodes 35, 36 and 37 and the pull-up resistor 38. Input terminal 34A is connected to the anode of diode 35, input terminal 34B is connected to the anode of diode 36, and input terminal 34C is connected to the anode of diode 37. The cathodes of these diodes are connected together at juncture 39. It is also to be understood that any number of diodes can be used, depending upon the number of input terminals desired. The pull-up resistor is connected between a negative potential B− and juncture 39. Briefly, the OR circuit of Fig. 6E operates as follows: when one or more of the input terminals, namely, 34A, 34B and 34C are UP, i.e., at approximately +5 volts, the juncture 39 and hence the output terminal 40 are UP, i.e., at approximately +5 volts. Correspondingly, if all of the input terminals are DOWN, i.e., at approximately −30 volts, the juncture 39 and the output terminal 40 are DOWN.

*The OR circuit of Figs. 6G and 6H.*—The OR circuit of Fig. 6G includes a plurality of input terminals 43A, 43B and 43C, the diodes 45, 46 and 47, a pull-up resistor 49 and a cathode follower tube, triode 51. Terminal 43A is connected to the anode of diode 47, terminal 43B is connected to the anode of diode 46 and terminal 43C is connected to the anode of diode 45. The cathodes of diodes 45, 46 and 47 are connected together at juncture 48 which is connected through the parasitic suppressing resistor PS to the grid of the tube 51. The cathode of triode 51 is connected through the voltage dividing resistors 52 and 53 to a negative potential B−. Output terminal 54 is connected to the juncture of resistors 52 and 53. The plate of triode 51 is connected through resistor 55 to a positive potential B+ and through a capacitor 56 to ground. Briefly, the OR circuit of Fig. 6G functions as follows: when one or more of the input terminals 43A, 43B and 43C are UP, i.e., at approximately +5 volts, the juncture 48 and consequently the grid of triode 51 is UP. This results in the cathode follower tube being fully conductive and causing the output terminal 54 to be UP. Conversely if all the input terminals are DOWN, the output terminal 54 is DOWN. Once again it should be appreciated that any number of input terminals and diodes can be used in an OR circuit of the type shown in Fig. 6G. The OR circuits of Figs. 6E and 6G are functionally similar and these circuits may be interchanged unless circuit requirements indicate that cathode follower tube 51 of Fig. 6G is necessary. Fig. 6H is distinguished from Fig. 6F by the letters CF which indicates that a cathode follower tube is used therein.

*The delay circuit of Figs. 6W, 6Y and 6Z.*—The delay circuit of Fig. 6W is fully disclosed and claimed in Reissue Patent No. Re. 23,699 granted to Byron L. Havens on August 18, 1953. The delay circuit of Fig. 6W is also disclosed in U.S. patent application of Byron L. Havens et al., Serial No. 338,122 entitled "Serial-Parallel Binary-Decimal Adder" filed on February 20, 1953, now Patent No. 2,938,668. Briefly, the function of the delay circuit of Fig. 6W is as follows: an input pulse applied to the input terminal 154 during one preselected time interval produces an output pulse at the output terminal 156 during the next subsequent time interval. An input pulse may be applied to the input terminal during the same time interval that an output pulse is produced at the output terminal 156, i.e., the flyback produced by an input pulse is used to set up the output pulse and the circuitry is such that there is complete isolation between the output and input pulses during any given time interval. At this point it will suffice to appreciate that if input terminal 154 is UP during a first microsecond output terminal 156 will be UP during the next subsequent microsecond. Further, that if input terminal 154 is UP for a first and second microsecond that output terminal 156 will be UP for the second and third microseconds. It will be appreciated that the time delay, namely, one microsecond, is a function of the circuit parameters of the circuit of Fig. 6W.

*The digit check circuit of Figs. 6S and 6T.*—Fig. 6S discloses a digit check circuit which determines whether the 4 binary bits representing a decimal value in binary-decimal notation have a decimal value greater than 9. The circuit of Fig. 6S also accomplishes the combining of the 8 bit and 4 bit input terminals to produce a single electrical output if either the 8 bit or 4 bit are present, i.e., binary 1 in either or both the 8 or 4 position. It is desirable to have a representation which combines the inputs of the 4 bit and 8 bit since in the instant checking circuit the value of the binary bit is disregarded, i.e., the circuit takes cognizance only of the number of binary 1's present in a decimal value written in binary-decimal notation. Further, the 4 bit and the 8 bit should never be present within a single decimal position. As it will be apparent hereinafter, the circuitry is such that if an 8 bit and a 4 bit or an 8 bit and a 2 bit is present within any single decimal position, an indication of the error will be given by terminal E523 being in an UP position. Referring to Fig. 6S the 8, 4 and 2 bits are respectively applied to input terminals 908, 904 and 902. If either the 4 or the 2 bit is present (i.e., either terminal 904 or 902 is UP) the output terminal 16 of OR circuit 91 is caused to be in the UP position. It will be seen that the output terminal 16 of OR circuit 91 is connected to the input terminal 19A of AND circuit 92. The other input terminal, namely, 19B, of AND circuit 92 is connected to the 8 bit input terminal of the digit check circuit, namely, terminal 908. It will be seen that if terminal 908 is UP and either terminal 904 or terminal 902 is also UP, that the output terminal 16 of OR circuit 91 is UP resulting in input terminal 19A of AND circuit 92 being UP. Since terminal 908 is also UP input terminal 19B of AND circuit 92 is UP resulting in the output terminal 93 of the digit check circuit being in the UP position and indicating that a decimal value greater than 9 was impressed on the input terminals of the digit check circuit. Thus, whenever an 8 bit and a 4 bit, or a 2 bit are present simultaneously, AND circuit 92 is operated causing the output terminal 93 to be UP. In this way a decimal equivalent value greater than 9 is indicated. However, since a decimal digit expressed in binary-decimal notation cannot have a value greater than 9 an error in calculation or transmission of data is indicated by terminal 93 being UP. It will be observed from Fig. 6S that the digit check circuit input terminal 908 is connected to input terminal 43B of OR circuit 94 and that digit check circuit input terminal 904 is connected to input terminal 43A of OR circuit 94. Output terminal 54 of OR circuit 94 is connected to digit check circuit output terminal 95. Thus whenever an 8 bit or a 4 bit is present, terminal 95 will be UP, indicating the presence of either an 8 bit or a 4 bit.

*The inverter circuit of Fig. 6M.*—Fig. 6M illustrates an inverting circuit which produces a negative voltage pulse at its output terminal 76 when a positive voltage pulse is applied to its input terminal 67, and vice versa. In other words, when input terminal 67 is UP, output terminal 76 is DOWN, and when input terminal 67 is DOWN, output terminal 76 is UP. Input terminal 67 is connected through the parasitic suppressing resistor PS to the grid of tube 69L. When input terminal 67 is UP, the grid of tube 69L is UP and thus said tube is fully conductive. The anode of tube 69L is connected through the anode load resistor 70 and decoupling circuit 71 to a positive potential B+. Connected between the anode of tube 69L and a negative voltage B— are the voltage dividing resistors, namely, serially connected resistors 72 and 73. The anode of the tube 69L is directly coupled to the grid of tube 69R. A frequency compensating coupling capacitor 75 is connected in parallel with resistor 72. When input terminal 67 is UP resulting in tube 69L being fully conductive, the anode of said tube is DOWN causing the grid of tube 69R to be DOWN. When the grid of tube 69R is DOWN, the tube is less conductive and output terminal 156 is DOWN. Tube 69R operates as a cathode follower, the output terminal 76 being connected to the cathode of said tube. When input terminal 67 is DOWN, tube 69L will be nonconductive and its anode will be at approximately B+ potential. The action of the voltage dividing resistors 72 and 73 causes the grid of cathode follower tube 69R to be UP so that the output terminal 76 is also UP.

*The Binary Adder of Figs. 6U and 6V.*—A logical circuit which effects addition in true binary fashion is illustrated in Fig. 6U and is termed a Binary Adder. The presence of a pulse (terminal being in the UP condition) at one of the input terminals 110, 111 or 112 indicates the presence of a binary 1 while the absence of a pulse thereat indicates a binary 0. To effect addition in true binary fashion, the output terminals must exhibit a binary 0 sum and a binary 0 carry when no pulse (all input terminals in DOWN condition) is applied to the input terminals 110, 111 and 112. A binary 1 sum and a binary 0 carry must appear at the output terminals when an input pulse is applied to only one of the input terminals. A binary 0 sum and a binary 1 carry must appear at the output terminals when input pulses are applied to only two of the input terminals, i.e., any two of the three input terminals being in the UP condition results in a binary 0 sum and a binary 1 carry output. Finally, a binary 1 sum and a binary 1 carry must appear at the output terminals when pulses are applied simultaneously to all three input terminals, i.e., all three input terminals simultaneously in the UP condition. The input terminals 110, 111, 112 of the Binary Adder are respectively connected to the input terminals 19A, 19B and 19C of AND circuit 115. The output terminal 31 of AND circuit 115 is connected to the sum output terminal S116 of the Binary Adder. Output terminal 31 of AND circuit 133 is also connected to the sum output terminal S116 of the Binary Adder.

AND circuit 133 and AND circuit 115 are very similar except that AND circuit 115 has three inputs whereas AND circuit 133 has two inputs and AND circuit 133 lacks a cathode resistor as its output terminal 31 is connected to output terminal 31 of AND circuit 115. The connection between terminals 31 of AND circuits 115 and 133 results in an OR circuit wherein the respective legs of the OR circuit are AND circuit 133 and AND circuit 115. Thus, if either AND circuit 115 or AND circuit 133 is operated, the sum output terminal S116 is UP. As will be apparent from Fig. 6U, AND circuit 115 is operated when input terminals 110, 111 and 112 are all simultaneously UP. The function of AND circuit 115 is to provide a binary 1 sum output whenever three separate binary 1's are simultaneously applied to the input terminals 110, 111 and 112.

When either of the input terminals 110 or 111 is UP, OR circuit 117 of Fig. 6U is operated so that the output terminal 40 thereof and the input terminal 19A of AND circuit 122 are UP. When input terminal 111 or 112 is UP (binary 1 present) the OR circuit 118 is rendered operative and input terminal 19B of AND circuit 122 is UP. Likewise, when either input terminal 110 or 112 is UP, OR circuit 119 is operated resulting in input terminal 19C of AND circuit 122 being UP. In summary, when input terminal 110 is UP, OR circuits 117 and 119 are operated; when input terminal 111 is UP, OR circuits 117 and 118 are operated; and if input terminal 112 is UP, OR circuits 118 and 119 are operated. It will now be apparent that if any two or more of the input terminals 110, 111 and 112 are simultaneously UP, the input terminals 19A, 19B and 19C of AND circuit 122 will be simultaneously UP. For example, if terminals 110 and 111 are UP, the UP condition of terminal 110 causes OR circuits 117 and 119 to be operated resulting in terminals 19A and 19C of AND circuit 122 being UP, whereas the UP condition of terminal 111 causes OR circuits 117 and 118 to be operated resulting in input terminals 19A and 19B of AND circuit 122 being UP. Thus, all the input terminals, namely, 19A, 19B and 19C of AND circuit 122 are UP at the same time resulting in the output terminal 31 of AND circuit 122 being UP. The output terminal 31 of AND circuit 122 is connected to the binary 1 carry output terminal C123 of the Binary Adder. Thus, when the output terminal 31 of AND circuit 122 is UP, a binary 1 carry appears at terminal C123. In the Binary Adder circuit of Fig. 6U the carry output terminal C123 is connected by lead 124 to input terminal 67 of inverter 126. The output terminal 76 of inverter 126 is connected by lead 128 to terminal 129 of the Binary Adder (from Fig. 6U it will be noted that terminal 129 is effectively input terminal 19B of AND circuit 133). The occurrence of a binary 1 carry (terminal C123 UP) which results when any two or all three of input terminals 110, 111 and 112 of the Binary Adder are simultaneously UP renders the output of inverter 126 DOWN thereby causing terminal 19B of AND circuit 133 to be DOWN. In summation, the input terminal 19B of AND circuit 133 is UP only when a binary 1 carry does not occur.

When any one or more of input terminals 110, 111 and 112 are UP, OR circuit 134 operates resulting in input terminal 19A of AND circuit 133 being UP. From the immediately proceeding discussion, it will be recalled that terminal 19B of AND circuit 133 is UP when a binary 1 carry is not present. It will be recalled that a binary 1 carry is present only when two or all three of the input terminals of the Binary Adder are simultaneously UP. Accordingly, when only one of the input terminals 110, 111, 112 is UP, the input terminals 19A and 19B of AND circuit 133 are UP resulting in output terminal S116 of the Binary Adder being UP.

*The MODIFIED Binary Adder of Figs. 6UA and 6VA.*—From an inspection and comparison of Fig. 6U of the Binary Adder and Fig. 6UA of the MODIFIED Binary Adder, it will be seen that they differ in that the inverter circuit 126 of the Binary Adder is omitted from the MODIFIED Binary Adder. Referring to Fig. 6U it will be seen that the Binary Adder has only two output terminals, namely, the binary 1 carry output terminal C123 and the binary 1 sum output terminal 116. Now referring to Fig. 6VA, it will be seen that the MODIFIED Binary Adder has the same number of input terminals as the Binary Adder, has two output termnials, namely C123 and S216 (corresponding to terminals C123 and S116 of the Binary Adder) and in addition terminal 129 which is connected to input terminal 19B of AND circuit 133. The MODIFIED Binary Adder of Fig. 6U functions in many respects similar to that of the Binary Adder of Fig. 6U. Briefly, for example, if any two or all three of the input terminals of the Binary Adder of Fig. 6U are UP, binary 1 carry terminal C123 will be UP. Likewise, with respect to the MODIFIED Binary Adder of Fig. 6UA, i.e., if any two or all three of the input terminals are UP, binary 1 carry terminal C123 will be UP. Further, if all three input terminals of the Binary Adder are UP the binary 1 carry terminal C123 and the binary 1 sum terminal S116 will be UP. Likewise as to the MODIFIED Binary Adder of Fig. 6UA, i.e., if all three input terminals of the MODIFIED Binary Adder are UP the binary 1 carry terminal C123 and the binary 1 sum terminal S216 thereof are UP. The functional distinction in the Binary Adder and the MODIFIED Binary Adder occurs when only one of the input terminals of the Binary Adder and of the MODIFIED Binary Adder respectively are UP. When only one of the input terminals of the Binary Adder of Fig. 6U is UP the sum output terminal S116 will be UP. This is true since OR circuit 134 of Fig. 6U will operate in response to any one of the three input terminals of the Binary Adder being UP, and results in input terminal 19A of AND circuit 133 being UP. The other input terminal 19B of AND circuit 133 is UP since a binary 1 carry is not present. Now since both of the input terminals of AND circuit 133 are UP the sum output terminal S116 will be UP. In the case of the MODIFIED Binary Adder, when only one of the input terminals is UP this per se will not result in binary 1 sum terminal S216 being UP since the input terminal 19B of AND circuit 133 is connected to terminal 129 and this terminal may be either in the UP or DOWN condition depending on circuitry external to the MODIFIED Binary Adder.

*The AND circuit of Figs. 6CA and 6DA.*—The AND circuits of Figs. 6CA and 6C are very similar with the exception that the AND circuit of Fig. 6CA omits resistor 30 and its connection to a negative potential B—. Even with this difference the AND circuit of Fig. 6CA, where utilized functions in essentially the same manner as that of the AND circuit shown in Fig. 6C. The AND circuit of Fig. 6CA is usually used as one member of a pair (wherein output terminals 31 of each member are connected in common) of AND circuits wherein the other member is an AND circuit of the type shown in Fig. 6C.

*The OR circuit of Figs. 6GA and 6HA.*—The OR circuit of Fig. 6GA and of Fig. 6G are very similar with the exception that the OR circuit of Fig. 6GA omits resistor 53. Even with this difference the OR circuit of Fig. 6G functions in essentially the same manner as that of the OR circuit shown in Fig. 6G. The OR circuit of Fig. 6GA is usually used as one member of a pair (wherein output terminals 54 are connected in common) of OR circuits wherein the other member is an OR circuit of the type shown in Fig. 6G.

*The digit check circuit of Figs. 6SA and 6TA.*—The digit check circuit of Fig. 6SA is very similar and functions identically to the digit check circuit of Fig. 6S. However, the digit check circuit of Fig. 6SA utilizes an AND circuit of the type shown in Fig. 6CA, whereas the digit check circuit of Fig. 6S utilizes an AND circuit of the type shown in Fig. 6C.

*The check circuit*

The circuit of the novel checking circuit herein disclosed is illustrated in Figs. 2, 3, 4 and 5 of the drawing. The input terminals of the checking circuit aligned across the top of Figs. 2 and 3 are capable of accepting up to a 16-digit position word and its indicator. The input terminals are referred to as data line terminals and are labelled as follows: DL1–1, DL1–2, DL1–4, DL1–8, DL2–1, DL2–2, DL2–4, DL2–8, DL3–1, DL3–2, etc. The sixty-six terminals are divided into sixteen groups of four and one group of two. Each group of four has a terminal for accepting a 1 bit, a terminal for accepting a 2 bit, a terminal for accepting a 4 bit, and a terminal for accepting an 8 bit. The groups of four are labelled from right to left as follows: DL followed by the decimal position in decimal notation followed by a "—" (dash) and a 1, 2, 4 or 8 indicating the bit value. For example, DL9–4 indicates the 4 bit of the ninth decimal position. The sixteen decimal positions appearing from right to left are consistently labelled and accept a word expressed in binary decimal notation. The two terminals DL17–1 and DL17–2 appearing at the extreme left of Fig. 2, except the indicator of the word appearing on the data line terminals to the right.

The binary bits appearing on the first sixty-four terminals reading from right to left (decimal positions 1–16) are first examined to determine whether the binary bits present within any decimal position have an equivalent decimal value greater than 9. Actually all that is determined is whether or not within any decimal position, a binary 1 representing an 8 bit and a binary 1 representing a 4 bit, or a binary 1 representing an 8 bit and a binary 1 representing a 2 bit are present. Included in the means for checking whether a value greater than 9 exists in any decimal position, is an arrangement whereby the 8 bit and 4 bit input terminals of the checking circuit are so connected as to render a single output. These two functions are accomplished by the digit check circuits shown in Figs. 2 and 3 of the drawing.

The input terminals of the 2, 4 and 8 bits of each of the digit positions 1–16 are respectively connected to the input terminals 902, 904 and 908 of the digit check circuits (there is a digit check circuit for each decimal position). As will be recalled from an earlier discussion of Figs. 6S and 6SA, terminal 93 of the digit check circuit will be UP if an 8 bit and a 4 bit, or an 8 bit and a 2 bit are present simultaneously in the decimal position with which the digit check circuit is associated. It was also pointed out how the presence of a 4 bit or an 8 bit within a decimal position resulted in the output terminal 95 of the digit check circuit associated with said decimal position being UP.

Figure 1:
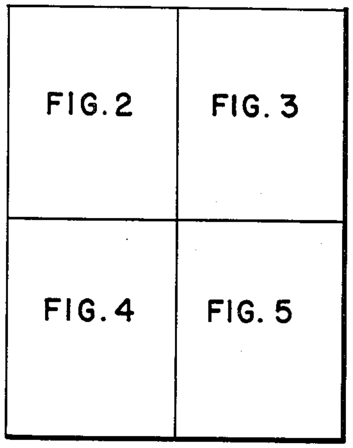

Referring to Figs. 2 and 3 of the composite Fig. 1, it will be seen that: output terminal 93 of digit check circuit 501 and output terminal 93 of digit check circuit 502 are connected in common through a lead 352 to input terminal 43A of OR circuit 520; output terminal 93 of digit check circuit 503 and output terminal 93 of digit check circuit 504 are connected in common through lead 353 to input terminal 43B of OR circuit 520; output terminal 93 of digit check circuit 505 and output terminal 93 of digit check circuit 506 are connected in common through lead 354 to input terminal 43C of OR circuit 520; output terminal 93 of digit check circuit 507 and output terminal 93 of digit check circuit 508 are connected in common through lead 355 to input terminal 43D of OR circuit 520; output terminal 93 of digit check circuit 509 and output terminal 93 of digit check circuit 510 are connected in common through lead 356 to input terminal 43A of OR circuit 521; output terminal 93 of digit check circuit 511 and output terminal 93 of digit check circuit 512 are connected in common through lead 357 to input terminal 43B of OR circuit 521; output terminal 93 of digit check circuit 513 and output terminal 93 of digit check circuit 514 are connected in common through lead 358 to input terminal 43C of OR circuit 521; and output terminal 93 of digit check circuit 515 and output terminal 93 of digit check circuit 516 are connected in common through lead 359 to input terminal 43D of OR circuit 521. Further, it will be noted that output terminal 54 of OR circuit 521 and output terminal 54 of OR circuit 520 are connected in common through lead 418 to input terminal 154 of delay unit 522 and that output terminal 156 of delay unit 522 is connected through lead 436 to greater-than-9 check terminal E523.

If the equivalent decimal value within any decimal position, namely, positions 1–16 is greater than 9, one of the terminals 93 of a digit check circuit will be UP and result in one of the inputs of OR circuits 520 and 521 being UP. When any one or more inputs of OR circuits 520 and 521 are UP, lead 418 will be UP. When lead 418 is UP, terminal 154 of delay circuit 522 is UP and one microsecond later, output terminal 156 and greater-than-9 check failure terminal E523 will be UP. If terminal E523 is UP, it indicates that there is an error, i.e., that the decimal value within one or more decimal positions is greater than 9.

From Fig. 3 it will be seen that: data line terminal DL1–1 is connected via lead 301 to input terminal 112 of binary adder 531; data line terminal DL2–1 is connected via lead 307 to input terminal 112 of binary adder 532; data line terminal DL3–1 is connected via lead 308 to input terminal 112 of binary adder 533; data line terminal DL4–1 is connected via lead 313 to input terminal 112 of binary adder 534; data line terminal DL5–1 is connected via lead 314 to input terminal 112 of binary adder 535; data line terminal DL6–1 is connected via lead 319 to input terminal 112 of binary adder 536; data line terminal DL7–1 is connected via lead 320 to input terminal 112 of binary adder 537; data line terminal DL8–1 is connected via lead 325 to input terminal 112 of binary adder 538; data line terminal DL9–1 is connected via lead 326 to input terminal 112 of binary adder 539; data line terminal DL10–1 is connected via lead 331 to input terminal 112 of binary adder 540; data line terminal DL11–1 is connected via lead 332 to input terminal 112 of binary adder 541; data line terminal DL12–1 is connected via lead 337 to input terminal 112 of binary adder 542; data line terminal DL13–1 is connected via lead 338 to input terminal 112 of binary adder 543; data line terminal DL14–1 is connected via lead 344 to input terminal 112 of binary adder 544; data line terminal DL15–1 is connected via lead 345 to input terminal 112 of binary adder 545; and data line terminal DL16–1 is connected via lead 348 to input terminal 112 of binary adder 546.

From Figs. 2 and 3, it will be seen that: data line terminal DL1–2 is connected to input terminal 902 of digit check circuit 501 and via lead 302 to input terminal 111 of binary adder 531; data line terminal DL2–2 is connected to input terminal 902 of digit check circuit 502 and via lead 306 to input terminal 111 of binary adder 532; data line terminal DL3–2 is connected to input terminal 902 of digit check circuit 503 and via lead 309 to input terminal 111 of binary adder 533; data line terminal DL4–2 is connected to input terminal 902 of digit check circuit 504 and via lead 312 to input terminal 111 of binary adder 534; data line terminal DL5–2 is connected to input terminal 902 of digit check 505 and via lead 315 to input terminal 111 of binary adder 535; data line terminal DL6–2 is connected to input terminal 902 of digit check circuit 506 and via lead 318 to input terminal 111 of binary adder 536; data line terminal DL7–2 is connected to input terminal 902 of digit check circuit 507 and via lead 321 to input terminal 111 of binary adder 537; data line terminal DL8–2 is connected to input terminal 902 of digit check circuit 508 and lead 324 to input terminal 111 of binary adder 538; data line terminal DL9–2 is connected to input terminal 902 of digit check circuit 509 and via lead 327 to input terminal 111 of binary adder 539; data line terminal DL10–2 is connected to input terminal 902 of digit check circuit 510 and via lead 330 to input terminal 111 of binary adder 540; data line terminal DL11–2 is connected to input terminal 902 of digit check circuit 511 and via lead 333 to input terminal 111 of binary adder 541; data line terminal DL12–2 is connected to input terminal 902 of digit check circuit 512 and via lead 336 to input terminal 111 of binary adder 542; data line terminal DL13–2 is connected to input terminal 902 of digit check circuit 513 and via lead 539 to input terminal 111 of binary adder 543; data line terminal DL14–2 is connected to input terminal 902 of digit check circuit 514 and via lead 343 to input terminal 111 of binary adder 344; data line terminal DL15–2 is connected to input terminal 902 of digit check circuit 515 and via lead 346 to input terminal 111 of binary adder 545; and data line terminal DL16–2 is connected to input terminal 902 of digit check circuit 516 and via lead 347 to input terminal 111 of binary adder 546. Data line terminal DL17–1 is connected via lead 350 to input terminal 110 of binary adder 560 and data line terminal DL17–2 is connected via lead 351 to input terminal 111 of binary adder 561.

It will be recalled that the 4 bit terminal of each decimal position, namely, terminals DL1–4, DL2–4, etc., are respectively connected to input terminals 904 of digit check circuits 501 through 516, and that the 8 bit terminal of each decimal position, namely, terminals DL1–8, DL2–8, etc., are respectively connected to input terminals 908 of digit check circuits 501 through 516.

Still referring to Figs. 2 and 3, it will be seen that output terminal 95 of digit check circuit 501 is connected via lead 303 to input terminal 110 of binary adders 531. In like manner output terminals 95 of digit check circuits 502—516 are respectively connected each through one of the following leads: 304, 310, 311, 316, 317, 322, 323, 328, 329, 334, 335, 340, 341, 342 and 349, to the input terminals 110 of binary adders 532—546.

The connection and operation of binary adder 531 whose detailed schematic circuit diagram is shown in Fig. 6U and whose operation was discussed earlier, is identical with binary adders 532—546. Thus, it will be seen that the information applied to terminal 110 of binary adder 531 indicates that the binary decimal digit of decimal position 1 contained either an 8 bit or a 4 bit, i.e., if either an 8 bit or a 4 bit is present in decimal position 1, terminal 110 of binary adder 531 is UP. Terminal 111 of binary adder 531 will be UP if a 2 bit is present within decimal position 1. Terminal 112 of binary adder 531 will be UP if a 1 bit is present within decimal position 1. Like statements as to binary adders 532—546 can be made. It will be recalled that if only one of the input terminals 110, 111 and 112 of binary adder 531 is UP, the output terminal S116 is UP while the carry terminal C123 is DOWN. If all three of the input terminals of the binary adder 531 are UP, both the sum output terminal S116 and the carry output terminal C123 are UP. If any two of the input terminals of binary adder 531 are UP, the carry output terminal C123 will be UP and the sum output terminal S116 will be DOWN.

Now, keeping in mind that the novel checking circuit disclosed in Figs. 2, 3, 4 and 5 is actually a MODULO 4 check on the binary 1's present in a word expressed in binary-decimal notation, it will be convenient to assign a value of 1 to each sum ouput terminal S116 of binary adders 531—546. In like manner, it will be convenient to assign a value of 2 to each carry output terminal C123 of binary adders 531—546. The value of 1 given to terminal S116 of binary adders 531—546 is arrived at due to the fact that said terminal is UP whenever a binary addition produces a sum of binary 1. The carry output terminal C123 of binary adders 531—546 have been assigned a value of 2 since it is UP if two or more binary bits are applied to the input terminals 110, 111 and 112 of the binary adders 531—546. Accordingly, if a single binary bit is applied to any one of the input terminals of any of the binary adders 531—546, the sum output terminal S116 of that binary adder is UP and the carry output terminal C123 of said adder is DOWN, thus indicating a value of 1. Further, if three binary bits are applied to the input terminals of any one of the binary adders 531—546, the output terminals of said adder, namely, sum output terminal S116 and carry output terminal C123 are both UP indicating a total value of 3. If any two of the three input terminals of any of the binary adders 531—546 are UP, the carry output terminal C123 of said adder will be UP, indicating a value of 2.

Again referring to Figs. 2 and 3, it will be seen that: sum output terminal S116 of binary adder 531 is connected via lead 360 to input terminal 112 of binary adder 550; carry output terminal C123 of binary adder 531 is connected via lead 361 to input terminal 112 of binary adder 551; sum output terminal S116 of binary adder 532 is connected via lead 362 to input terminal 111 of binary adder 550; carry output terminal C123 of binary adder 532 is connected via lead 363 to input terminal 111 of binary adder 551; sum output terminal S116 of binary adder 533 is connected via lead 364 to input terminal 110 of binary adder 550; carry output terminal C123 of binary adder 533 is connected via lead 365 to input terminal 110 of binary adder 551; sum output terminal S116 of binary adder 534 is connected via lead 366 to input terminal 112 of binary adder 552; carry output terminal C123 of binary adder 534 is connected via lead 367 to input terminal 112 of binary adder 553; sum output terminal S116 of binary adder 535 is connected via lead 368 to input terminal 111 of binary adder 552; carry output terminal C123 of binary adder 535 is connected via lead 369 to input terminal 111 of binary adder 553; sum output terminal S116 of binary adder 536 is connected via lead 370 to input terminal 110 of binary adder 552; carry output terminal C123 of binary adder 536 is connected via lead 371 to input terminal 110 of binary adder 553; sum output terminal S116 of binary adder 537 is connected via lead 372 to input terminal 112 of binary adder 554; carry output terminal C123 of binary adder 537 is connected via lead 373 to input terminal 112 of binary adder 555; sum output terminal S116 of binary adder 538 is connected via lead 374 to input terminal 111 of binary adder 554; carry output terminal C123 of binary adder 538 is connected via lead 375 to input terminal 111 of binary adder 555; sum output terminal S116 of binary adder 539 is connected via lead 376 to input terminal 110 of binary adder 554; carry output terminal C123 of binary adder 539 is connected via lead 377 to input terminal 110 of binary adder 555; sum output terminal S116 of binary adder 540 is connected via lead 378 to input terminal 112 of binary adder 556; carry output terminal C123 of binary adder 540 is connected via lead 381 to input terminal 112 of binary adder 557; sum output terminal S116 of binary adder 541 is connected via lead 379 to input terminal 111 of binary adder 556; carry output terminal C123 of binary adder 541 is connected via lead 352 to input terminal 111 of binary adder 557; sum output terminal S116 of binary adder 542 is connected via lead 380 to input terminal 110 of binary adder 556; carry output terminal C123 of binary adder 542 is connected via lead 383 to input terminal 110 of binary adder 557; sum output terminal S116 of binary adder 543 is connected via lead 384 to input terminal 112 of binary adder 558; carry output terminal C123 of binary adder 543 is connected via lead 387 to input terminal 112 of binary adder 559; sum output terminal S116 of binary adder 544 is connected via lead 385 to input terminal 111 of binary adder 558; carry output terminal C123 of binary adder 544 is connected via lead 388 to input terminal 111 of binary adder 559; sum output terminal S116 of binary adder 545 is connected via lead 386 to input terminal 110 of binary adder 558; carry output terminal C123 of binary adder 545 is connected via lead 389 to input terminal 110 of binary adder 559; sum output terminal S116 of binary adder 546 is connected via lead 390 to input terminal 112 of binary adder 560; and carry output terminal C123 of binary adder 546 is connected via lead 392 to input terminal 112 of binary adder 561. It will be noted that input terminals 110 of binary adders 560 and 561 are connected in common through lead 394 to a negative potential of —35 volts. As stated earlier, data line terminals DL17–1 and DL17–2 (indicator terminals) are respectively connected to input terminals 111 of binary adders 560 and 561.

Now, from an inspection of Figs. 2 and 3, it will seem that the input terminals of binary adder 550 are respectively connected to the sum output terminals of binary adders 531, 532 and 533. As stated earlier, the sum output terminals S116 of the binary adders 531—546 have an assigned value of 1. Thus, the inputs assigned to binary adder 550 each have an assigned value of 1 and therefore the sum output appearing at sum output terminal S116 of binary adder 550 has an assigned value of 1 and the carry output terminal appearing at carry output terminal C123 of binary adder 550 has an assigned value of 2. Further, it will be noted that the input terminals of binary adder 551 are respectively connected to the carry output terminals of binary adders 531, 532 and 533. Now, as stated earlier, the carry output terminals of binary adders 531—546 have an assigned value of 2. Thus, each of the inputs of binary adder 551 have an assigned value of 2 and therefore the sum output terminal of said adder will necessarily have an assigned value of 2 and the carry output terminal of said adder an assigned value of 4. The foregoing relationships set forth in detail with respect to binary adders 550, 551 and binary adders 531, 532 and 533 are followed through with respect to the following groups of adders, namely: binary adders 552 and 553 with respect to binary adders 534, 535 and 536; binary adders 554 and 555 with respect to binary adders 537, 538 and 539; binary adders 556, 557 with respect to binary adders 540, 541 and 542; binary adders 558 and 559 with respect to binary adders 543, 544 and 545; and binary adders 560 and 561 with respect to binary adder 546, data line terminals DL17–1, DL17–2 and the negative 35 volt potential applied on input terminals 110 of binary adders 560 and 561.

Actually, in summary, it may be stated that: when terminal S116 of any of the following binary adders is UP, an assigned value of 1 is present; binary adders 550, 552, 554, 556, 558 and 560. Further, that when carry output terminal C123 of any of the following binary adders is UP, an assigned value of 2 is present; binary adders 550, 552, 554, 556, 558 and 560. When sum output terminal S116 of any of the following binary adders is UP an assigned value of 2 is present; binary adders 551, 553, 555, 557, 559 and 561. When the carry output terminal C123 of any of the following binary adders is UP, an assigned value of 4 is present; binary adders 551, 553, 555, 557, 559 and 561.

It will be appreciated that the total possible value appearing at sum output terminal S116 and carry output terminal C123 of each of the binary adders 550, 552, 554, 556, 558 and 560 is 3. Likewise, it will be apparent that the total possible value appearing at sum output terminal S116 and carry output terminal C123 of each of the binary adders 551, 553, 555, 557, 559 and 561 is 6. When the total possible value appearing at the output terminals of a binary adder is less than 4, it is unnecessary to perform a MODULO 4 computation. However, when the possible value at the output terminals of any binary adder is 4 or more, a MODULO 4 computation is necessary. As stated earlier, binary adders 551, 553, 55, 557, 559 and 561 have a possible value of 6 at their respective output terminals, i.e., a 2 at the sum output terminal and a 4 at the carry output terminal. Now, in order to perform the MODULO 4 computation, terminal C123 of the afore-recited binary adders are left unconnected.

Now again referring to Figs. 2, 3, 4 and 5 of the drawing, it will be seen that: sum output terminal S116 of binary adder 550 is connected via lead 400 to input terminal 154 of delay circuit 565; carry output terminal C123 of binary adder 550 is connected via lead 401 to input terminal 154 of delay circuit 570; sum output terminal S116 of binary adder 551 is connected via lead 402 to input terminal 154 of delay circuit 571; sum output terminal S116 of binary adder 552 is connected via lead 403 to input terminal 154 of delay circuit 566; carry output terminal C123 of binary adder 552 is connected via lead 404 to input terminal 154 of delay circuit 573; sum output terminal S116 of binary adder 553 is connected via lead 405 to input terminal 154 of delay circuit 575; sum output terminal S116 of binary adder 554 is connected via lead 406 to input terminal 154 of delay circuit 567; carry output terminal C123 of binary adder 554 is connected via lead 407 to input terminal 154 of delay circuit 576; sum output terminal S116 of binary adder 555 is connected via lead 408 to input terminal 154 of delay circuit 577; sum output terminal S116 of binary adder 556 is connected via lead 409 to input terminal 154 of delay circuit 585; carry output terminal C123 of binary adder 556 is connected via lead 410 to input terminal 154 of delay circuit 580; sum output terminal S116 of binary adder 557 is connected via lead 411 to input terminal 154 of delay circuit 581; sum output terminal S116 of binary adder 558 is connected via lead 412 to input terminal 154 of delay circuit 586; carry output terminal C123 of binary adder 558 is connected via lead 413 to input terminal 154 of delay circuit 582; sum output terminal S116 of binary adder 559 is connected via lead 414 to input terminal 154 of delay circuit 590; sum output terminal S116 of binary adder 560 is connected via lead 415 to input terminal 154 of delay circuit 587; carry output terminal C123 of binary adder 560 is connected via lead 416 to input terminal 154 of delay circuit 591; and sum output terminal S116 of binary adder 561 is connected via lead 417 to input terminal 154 of delay circuit 592.

Delay circuits 565 through 592 accept a pulse on their input terminals 154 and one microsecond later produce an output pulse on their terminals 156. The detailed circuit of each of the delay circuits represented by blocks 565—592 and of block 522 of Figs. 4 and 5 of the drawing is shown in detail in Fig. 6W. The delay circuit of Fig. 6W is fully disclosed and claimed in Reissue Patent No. Re. 23,699 granted to Byron L. Havens on August 18, 1953.

From an inspection of Figs. 2, 3, 4 and 5 of the drawing and the afore-recited connections in particular, it will be apparent that the output terminal 156 of each of the following delay circuits is of value 1: delay circuits 565, 566, 567, 585, 586 and 587. Correspondingly, the value at each of the output terminals 156 of the following delay circuits is 2: delay circuits 570, 571, 573, 575, 576, 577, 580, 581, 582, 590, 591 and 592.

Figure 5:
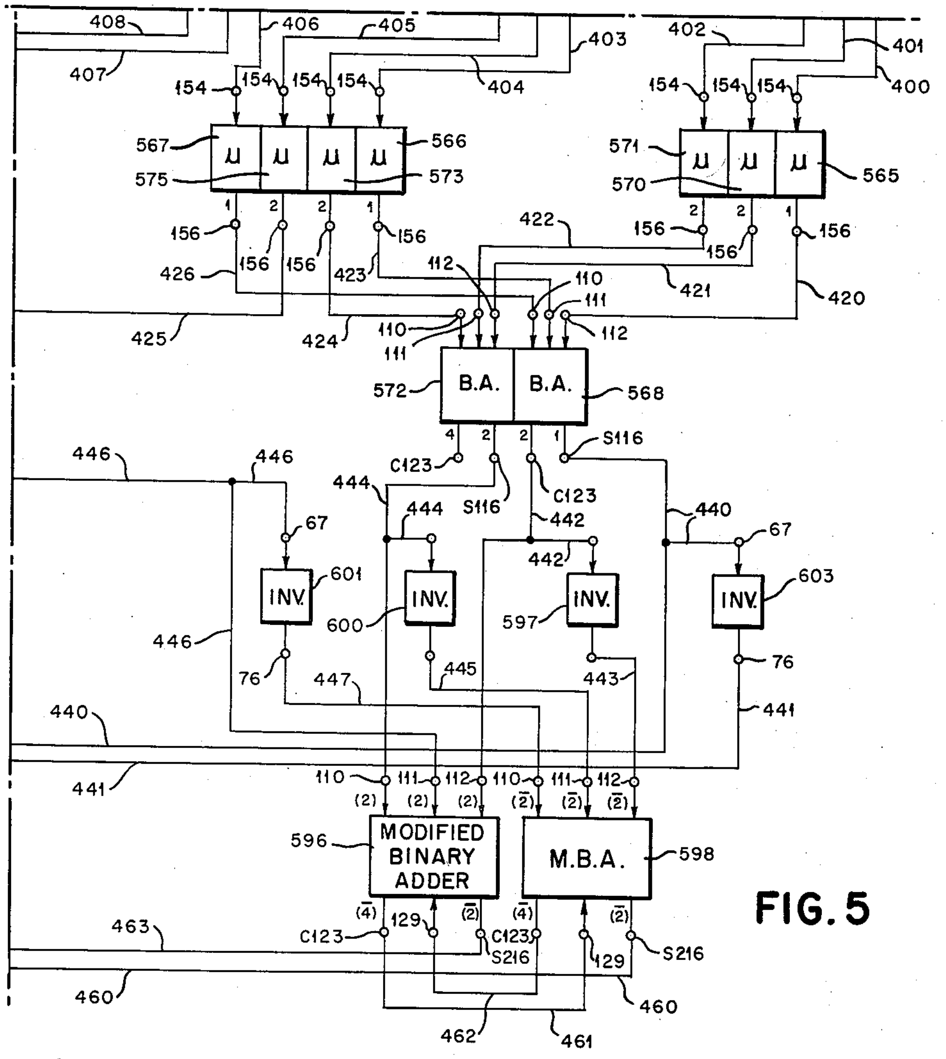
Figure 4:
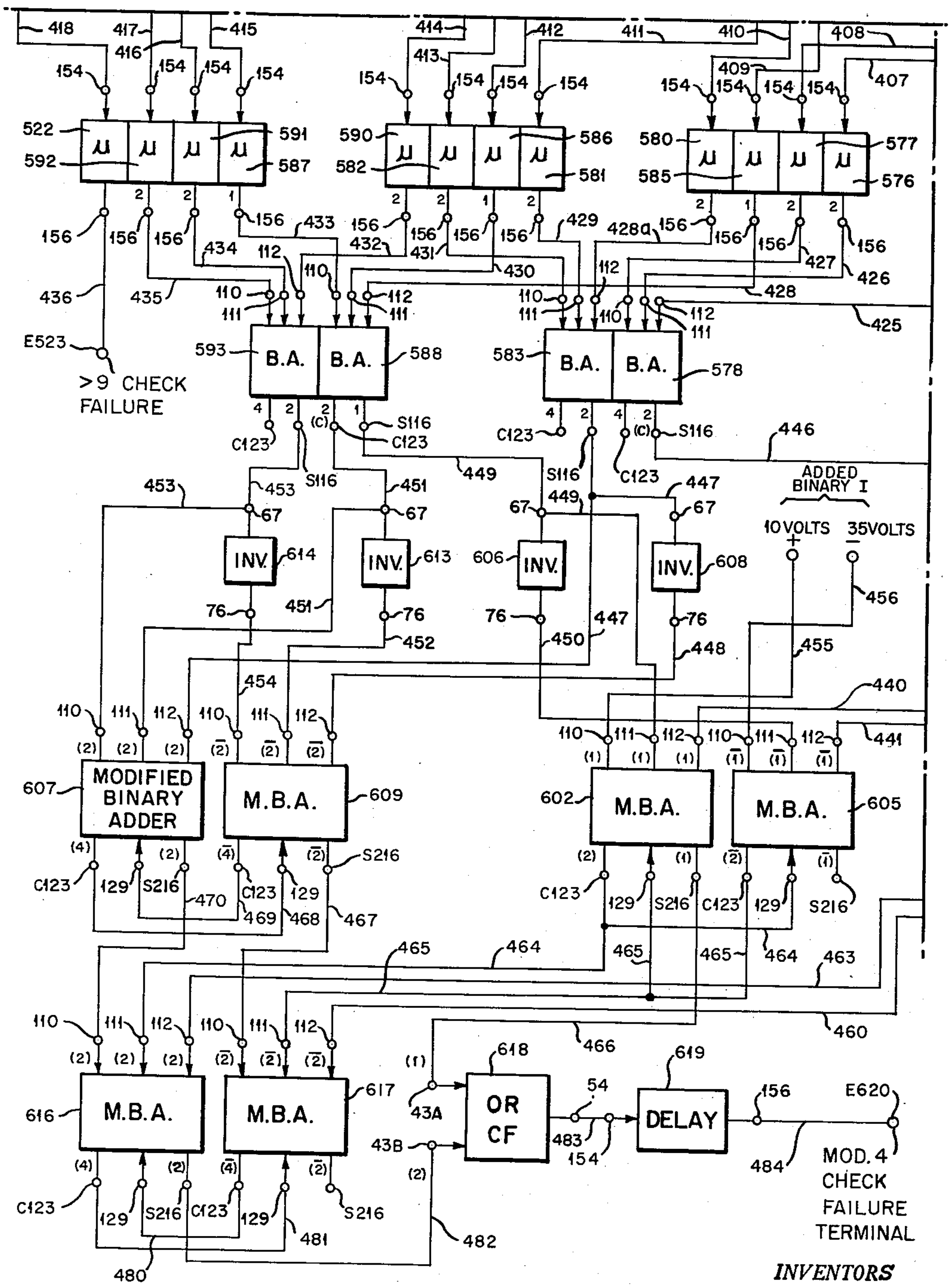

From an inspection of Figs. 4 and 5, it will be apparent that the input to each of the input terminals of binary adders 568, 578 and 588 is of value 1, whereas the input to each of the input terminals of binary adders 572, 583 and 593 is of value 2. The foregoing statements will be apparent if the following connections are inspected, namely: output terminal 156 of delay circuit 565 is connected via lead 420 to input terminal 112 of binary adder 568; output terminal 156 of delay circuit 566 is connected via lead 423 to input terminal 111 of binary adder 568; output terminal 156 of delay circuit 567 is connected via lead 426 to input terminal 110 of binary adder 568; output terminal 156 of delay circuit 570 is connected via lead 421 to input terminal 112 of binary adder 572; output terminal 156 of delay circuit 571 is connected via lead 422 to input terminal 111 of binary adder 572; output terminal 156 of delay circuit 573 is connected via lead 424 to input terminal 110 of binary adder 572; output terminal 156 of delay circuit 575 is connected via lead 425 to input terminal 112 of binary adder 578; output terminal 156 of delay circuit 576 is connected via lead 426 to input terminal 111 of binary adder 578; output terminal 156 of delay circuit 477 is connected via lead 427 to input terminal 110 of binary adder 578; output terminal 156 of delay circuit 580 is connected via lead 428 to input terminal 112 of binary adder 583; output terminal 156 of delay circuit 581 is connected via lead 429 to input terminal 111 of binary adder 583; output terminal 156 of delay circuit 582 is connected via lead 431 to input terminal 110 of binary adder 583; output terminal 156 of delay circuit 585 is connected via lead 428 to input terminal 112 of binary adder 588; output terminal 156 of delay circuit 586 is connected via lead 430 to input terminal 111 of binary adder 588; output terminal 156 of delay circuit 587 is connected via lead 433 to input terminal 110 of binary adder 588; output terminal 156 of delay circuit 590 is connected via lead 432 to input terminal 110 of binary adder 593; output terminal 156 terminal 111 of binary adder 593; and output terminal 156 of delay circuit 592 is connected via lead 435 to input terminal 110 of binary adder 593.

The sum output terminals of binary adders 568, 578 and 588 each have a value of 1, whereas the carry output terminals of said adders each have a value of 2. Thus, the highest possible output that adders 568, 578 and 588 could have, is 3. Therefore no MODULO 4 computation is necessary. The sum output terminals of binary adders 572, 583 and 593 each have a value of 2, whereas the carry output terminals of said adders have a value of 4. Thus, the highest possible output value of said binary adders is 6, necessitating a MODULO 4 computation. This MODULO 4 computation is performed by merely leaving unconnected terminal C123, namely, the carry output terminal of each of the binary adders 572, 583 and 593.

Referring to Figs. 4 and 5 of the drawing, it will be seen that: sum output terminal S116 of binary adder 568 is connected via lead 440 to input terminal 67 of inverter circuit 603 and to input terminal 112 of modified binary adder 602; carry output terminal C123 of binary adder 568 is connected via lead 442 to input terminal 67 of inverter circuit 597 and to input terminal 112 of modified binary adder 596; sum output terminal S116 of binary adder 572 is connected via lead 444 to input terminal 67 of inverter circuit 600 and to input terminal 110 of modified binary adder 596; sum output terminal S116 of binary adder 578 is connected via lead 446 to input terminal 67 of inverter circuit 601 and to input terminal 111 of modified binary adder 596; sum output terminal S116 of binary adder 583 is connected via lead 447 to input terminal 67 of inverter circuit 608 and to input terminal 112 of modified binary adder 607; sum output terminal S116 of binary adder 588 is connected via lead 449 to input terminal 67 of inverter circuit 606 and to input terminal 111 of modified binary adder 602; carry output terminal C123 of binary adder 588 is connected via lead 451 to input terminal 67 of inverter circuit 613 and to input terminal 111 of modified binary adder 607; and sum output terminal S116 of binary adder 593 is connected via lead 453 to input terminal 67 of inverter circuit 614 and to input terminal 110 of modified binary adder 607.

Still referring to Figs. 4 and 5, it will be seen that: output terminal 76 of inverter circuit 603 is connected via lead 441 to input terminal 112 of modified binary adder 605; output terminal 76 of inverter circuit 597 is connected via lead 443 to input terminal 112 of modified binary adder 598; output terminal 76 of inverter circuit 600 is connected via lead 445 to input terminal 111 of modified binary adder 598; output terminal 76 of inverter circuit 601 is connected via lead 447 to input terminal 110 of modified binary adder 598; output terminal 76 of inverter circuit 608 is connected via lead 448 to input terminal 112 of modified binary adder 609; output terminal 76 of inverter circuit 606 is connected via lead 450 to input terminal 111 of modified binary adder 605; output terminal 76 of inverter circuit 613 is connected via lead 452 to input terminal 111 of modified binary adder 609; and output terminal 76 of inverter circuit 614 is connected via lead 454 to input terminal 110 of modified binary adder 609.

It will also be noted that terminals 110 of modified binary adders 602 and 605 are respectively connected to a positive 10 volt potential and a negative 35 volt potential, accomplishing the addition of a binary 1.

Inverter circuits 597, 600, 601, 603, 606, 608, 613 and 614 have their respective output terminals 76 UP when their respective input terminals 67 are DOWN and vice versa. Thus, it will be seen from Figs. 4 and 5 of the drawing, that input terminals 110, 111 and 112 of modified binary adder 598 are UP when the input terminals 67 of inverter circuits 601, 600 and 597 are DOWN. Further, that the condition of input terminals 110, 111 and 112 of modified binary adder 596 are at all times the converse of the condition of the input terminals of modified binary adder 598. For example, if all of the input terminals of modified binary adder 598 are UP, then all of the input terminals 67 of inverter circuits 601, 600 and 597 must be DOWN and since the input terminals of modified binary adder 596 are respectively connected to the input terminals of the afore-recited inverter circuits, the input terminals of modified binary adder 596 will be DOWN. As a second example, assume that sum output terminal S116 of binary adder 572 is UP. This will result in terminal 110 of modified binary adder 596 being UP and terminal 111 of modified binary adder 598 being DOWN. Thus it is seen that terminals 111 and 112 of modified binary adder 596 are DOWN whereas terminal 110 of said modified binary adder is UP and that terminals 110 and 112 of modified binary adder 598 are UP and terminal 111 of modified binary adder 598 is DOWN. In brief, it may be said that at all times the number of input terminals of modified binary adder 596 that are in the UP condition will correspond to the number of input terminals of modified binary adder 598 that are in the DOWN condition and vice versa.

From Fig. 4 it will be seen that terminal 110 of modified binary adder 602 is normally UP since it has a positive potential of +10 volts impressed upon it, whereas terminal 110 of modified binary adder 605 is normally DOWN since it has a negative potential of −35 volts impressed upon it. Since terminal 111 of modified binary adder 602 is connected to the input terminal of inverter circuit 606 and input terminal 111 of modified binary adder 605 is connected to the output terminal of inverter circuit 606, it will be apparent that the condition of these two terminals of modified binary adders 602 and 605 will at all times be opposite, i.e., either one being UP, the other being DOWN and vice versa. The foregoing statement with respect to terminals 111 of modified binary adders 602 and 605 can be made also with respect to terminal 112 of said modified binary adders by noting that terminals 112 of modified binary adders 602 and 605 are respectively connected to the input and the output of inverter circuit 603. The input terminals of modified binary adder 607 are respectively connected to the input terminals of inverter circuits 614, 613 and 608, whereas the input terminals of modified binary adder 609 are respectively connected to the output terminals of said inverter circuits. Thus it is seen that at all times the number of input terminals of modified binary adder 607 that are in the UP condition will correspond to the number of input terminals of modified binary adder 609 that are in the DOWN condition and vice versa.

At this point a brief review of the operation of the modified binary adder represented respectively by blocks 596, 598, 602, 605, 607, 609, 616 and 617 is in order. The detailed circuit diagram of the modified binary adder is shown in Fig. 6U–A of the drawing. It will suffice at this point to recognize that if all three input terminals of the modified binary adder are UP simultaneously, the sum output terminal S216 and the carry output terminal C123 will be UP. If any two of the three input terminals of the modified binary adder are simultaneously UP, sum output terminal S216 is DOWN and carry output terminal C123 is UP. If only one of the three input terminals of the modified binary adder is UP, neither the sum output terminal S216 nor the carry output terminal C123 will be UP. However, if terminal 129 of the modified binary adder is UP simultaneously with one of the input terminals of the modified binary adder, the sum output terminal S216 will be UP.

Now again referring to Figs. 4 and 5 of the drawing, it will be seen that: sum output terminal S216 of modified binary adder 598 is connected via lead 460 to input terminal 112 of modified binary adder 617; carry output terminal C123 of modified binary adder 596 is connected via lead 461 to input terminal 129 of modified binary adder 598; carry output terminal C123 of modified binary adder 598 is connected via lead 462 to input terminal 129 of modified binary adder 596; sum output terminal S216 of modified binary adder 596 is connected via lead 463 to input terminal 112 of modified binary adder 616; carry output terminal C123 of modified binary adder 605 is connected via lead 465 to input terminal 129 of modified binary adder 602 and also to input terminal 111 of modified binary adder 617; sum output terminal S216 of modified binary adder 602 is connected via lead 466 to input terminal 43A of OR circuit 618; carry output terminal C123 of modified binary adder 602 is connected via lead 464 to input terminal 129 of modified binary adder 605 and also to input terminal 111 of modified binary adder 616; sum output terminal S216 of modified binary adder 609 is connected via lead 467 to input terminal 110 of modified binary adder 617; carry output terminal C123 of modified binary adder 609 is connected via lead 469 to input terminal 129 of modified binary adder 607; sum output terminal S216 of modified binary adder 607 is connected via lead 470 to input terminal 110 of modified binary adder 616; and carry output terminal C123 of modified binary adder 607 is connected via lead 468 to input terminal 129 of modified binary adder 609.

Now referring to Fig. 4, it will be seen that: carry output terminal C123 of modified binary adder 617 is connected via lead 480 to input terminal 129 of modified binary adder 616; carry output terminal C123 of modified binary adder 616 is connected via lead 481 to input terminal 129 of modified binary adder 617; sum output terminal S216 of modified binary adder 616 is connected via lead 482 to input terminal 43B of OR circuit 618; output terminal 54 of OR circuit 618 is connected via lead 483 to input terminal 154 of delay circuit 619; and output terminal 156 of delay circuit 619 is connected via lead 484 to MODULO 4 check failure terminal E620.

From an inspection of Figs. 4 and 5, it will be seen that terminal E620 will be in the UP condition indicating a MODULO 4 check failure only when either terminal 43A or 43B of OR circuit 618 is in the UP condition. Terminal 43A or OR circuit 618 will be in the UP condition only as a result of terminal S216 of modified binary adder 602 being in the UP condition. Sum output terminal S216 of modified binary adder 602 will be in the UP condition as a result of sum output terminal S116 of binary adder 588 and sum output terminal S116 of binary adder 568 each being simultaneously in the UP condition, or, carry output terminal C123 of modified binary adder 605 being in the UP condition. Input terminal 43B of OR circuit 618 will UP as a result of sum output terminal S216 of modified binary adder 616 being UP. Sum output terminal S216 of modified binary adder 616 will be in the UP condition as a result of one of the following conditions: sum output terminal S216 of modified binary adder 607, carry output terminal C123 of modified binary adder 602 and sum output terminal S216 of modified binary adder 596 each being simultaneously in their respective UP conditions, or, any one of the foregoing terminals and carry output terminals C123 of modified binary adder 607 being simultaneously in their respective UP conditions.

The operation of the entire MODULO 4 checking circuit as seen in Figs. 2, 3, 4 and 5 will be more readily understood from the following operational examples.

*Numerical Example No. 1.*—For the conditions of Example No. 1, let it be assumed that a word and its indicator as shown in Figs. 2 and 3 of the drawings and labeled Example No. 1 is impressed on the 66 data line terminals. It will be noted that data line terminals DL1–1, DL1–2, DL1–4, DL2–1, DL2–8, DL3–2, DL5–8, DL6–4, DL7–1, DL7–2, DL7–4, DL8–1, DL9–1, DL9–4, DL10–2, DL10–4, DL11–2, DL12–1, DL12–8, DL13–1, DL13–2, DL14–1, DL15–1, DL15–4, DL16–2, and DL17–2 are each respectively in the UP condition under the conditions of Example No. 1, i.e., a binary 1 is present at each of the afore-recited terminals. The remaining data line terminals are in their respective DOWN condition under the conditions of Example No. 1, i.e., a binary 0 is present at each of the remaining terminals.

From an inspection of the example, it will be noted that in no decimal position is there a decimal value greater than 9, i.e., the presence of a 4 bit and 8 bit or a 2 bit and 8 bit. Since in no decimal position is there a decimal value greater than 9 represented in binary-decimal notation, each of the output terminals 93 of digit check circuits 501 through 516 will remain in their respective DOWN condition under the conditions of Example No. 1. Thus, none of the input terminals of OR circuits 520 and 521 will be in the UP condition and as a result lead 418 connected to output terminals 54 of OR circuits 520 and 521 will remain in the DOWN condition as will greater-than-9 check failure terminal E523 is in the DOWN condition when no decimal position of the binary-decimal word contains a representation of a decimal value greater than 9.

It is to be recalled from the earlier discussion of the digit check circuit that terminal 95 thereof will be UP when either an 8 bit or a 4 bit are impressed on the input terminals thereof. Now taking cognizance of the fact that an 8 or a 4 bit is present in the decimal positions 1, 2, 5, 6, 7, 9, 10, 12 and 15 under the conditions of Example No. 1, terminal 95 of each of the following digit check circuits will be in the UP condition: digit check circuits 501, 502, 505, 506, 507, 509, 510, 512 and 515.

From the afore-recited conditions of Example No. 1 and taking cognizance of the connections clearly shown in Figs. 2 and 3 of the drawing, it will be apparent that the following terminals are respectively in the UP condition: input terminals 110, 111 and 112 and output terminals S116 and C123 of binary adder 531, input terminals 110 and 112 and output terminal C123 of binary adder 532; input terminal 111 and output terminal S116 of binary adder 533; input terminal 110 and output terminal S116 of binary adder 535; input terminal 110 and output terminal S116 of binary adder 536; input terminals 110, 111 and 112 and output terminals C123 and S116 of binary adder 537; input terminal 112 and output terminal S116 of binary adder 538; input terminals 110 and 112 and output terminal C123 of binary adder 539: input terminals 110 and 111 and output terminals C123 and S116 of binary adder 540; input terminal 111 and output terminal S116 of binary adder 541; input terminals 110 and 112 and output terminal C123 of binary adder 542; input terminals 111 and 112 and output terminal C123 of binary adder 543; input terminal 112 and output terminal S116 of binary adder 544; input terminals 110 and 112 and output terminal C123 of binary adder 545; and input terminal 111 and output terminal S116 of binary adder 546.

Now again referring to Figs. 2 and 3 of the drawing and observing the interconnections of the output terminals of binary adders 531 through 546 and the input terminals of binary adders 550 through 561, it will be apparent that the following conditions of input and output terminals of binary adders 550 through 560 exist as a result of the condition (i.e., UP or DOWN respectively) of the output terminals of binary adders 531 through 546: input terminals 110 and 112 and output terminal C123 of binary adder 550 are each in their respective UP condition; input terminals 111 and 112 and output terminal C123 of binary adder 551 are each in their respective UP condition; input terminals 110 and 111 and output terminal C123 of binary adder 552 are each in their respective UP condition; input terminals 111 and 112 and output terminal C123 of binary adder 554 are each in their respective UP condition; input terminals 110 and 112 and output terminal C123 of binary adder 555 are each in their respective UP condition; input terminal 111 and output terminal S116 of binary adder 556 are each in their respective UP condition; input terminals 110 and 112 and output terminal C123 of binary adder 557 are each in their respective UP condition; input terminal 111 and output terminal S116 of binary adder 558 and each in their respective UP condition; input terminals 110 and 112 and output terminal C123 of binary adder 559 are each in their respective UP condition; input terminal 112 and output terminal S116 of binary adder 560 are each in their respective UP condition; and input terminal 111 and output terminal S116 of binary adder 561 are each in their respective UP condition.

It will be noted that although the carry output terminal C123 of each of the binary adders 551, 555, 557 and 559 is UP under the conditions of Example No. 1, they have no effect on remaining portions of the MODULO 4 checking circuit since said terminals are unconnected. Actually, as pointed out earlier, each terminal C123 of binary adders 551, 553, 555, 557, 559 and 561 is left unconnected because it has a value of 4 (when in the UP condition) and by being left unconnected accomplish a MODULO 4 operation.

From Figs. 2, 3, 4 and 5, it will be noted that the connected output terminals of binary adders 550 through 561 are selectively interconnected through one microsecond delay circuits to binary adders 568, 572, 578, 583, 588 and 593. Further, that under the conditions of Example No. 1, taking cognizance of which output terminals of binary adders 550 through 561 are in the UP condition, it will be observed that the following terminals are in their respective UP condition: input terminals 110 and 112 and output terminal C123 of binary adder 572; input terminal 111 and output terminal S116 of binary adder 578; input terminals 110, 111 and 112 and output terminals C123 and S116 of binary adder 588; and input terminal 110 and output terminal S116 of binary adder 593. It will be observed that output terminal C123 of binary adders 572, 578, 583 and 593 are respectively left unconnected. Thus, the fact that output terminal C123 of binary adder 572 is UP under the conditions of Example No. 1 accomplishes a MODULO 4 operation but the condition of said terminal has no effect on the remaining portion of the circuit.

At this point, it is well to appreciate that when the input of an inverter circuit of the type represented by blocks 597, 600, 601, 603, 606, 608, 613, and 614 is in the UP condition, the output thereof is in the DOWN condition and vice versa. Thus it will be appreciated that under the conditions of Example No. 1 the input terminal of inverter circuits 601 606, 613 and 614 are respectively in their UP condition, whereas the input terminal of inverter circuits 597, 600, 603 and 608 are respectively in their DOWN condition. Now appreciating the relationship of the condition of the input terminal of the inverter circuits to the condition of the output terminal of the inverter circuits and the interconnection of the input terminals of modified binary adders 596, 598, 602, 605, 607 and 609 with the afore-recited inverter circuits and binary adders 568, 572, 578, 583, 588 and 593, it will be apparent that the following terminals are in their respective UP condition: input terminals 111 and 112 and output terminal C123 of modified binary adder 598; input terminal 111, terminal 129 and output terminal S116 of modified binary adder 596; input terminal 112, terminal 129 and output terminal S216 of modified binary adder 605; input terminals 110 and 111 and output terminal C123 of modified binary adder 602; input terminal 112, terminal 129 and output terminal S216 of modified binary adder 609; and input terminals 110 and 111 and output terminal C123 of modified binary adder 607. (It is to be observed that: output terminal C123 of modified binary adder 598 is connected to terminal 129 of modified binary adder 596; output terminal C123 of modified binary adder 596 is connected to terminal 129 of modified binary adder 598; and corresponding connections exist between modified binary adders 602, 605 and 607, 609.)

Now observing the interconnections between the output terminals of modified binary adders 596, 598, 602, 605, 607 and 609 and the input terminals of modified binary adders 616 and 617, it will be appreciated that the following terminals are in their respective UP condition: input terminals 111 and 112 and output terminal C123 of modified binary adder 616; and input terminal 110, terminal 129 and output terminal S216 of modified binary adder 617. (It is to be noted that output terminal C123 of modified binary adder 616 is connected in common to terminal 129 of modified binary adder 617; and that output terminal C123 of modified binary adder 617 is connected in common to terminal 129 of modified binary adder 616.)

It is to be noted that under the conditions of Example No. 1, output terminal S216 of modified binary adder 616 and output terminal S216 of modified binary adder 602 which are respectively connected to input terminals 43A and 43B of OR circuit 618 are in their respective DOWN conditions. Therefore, MODULO 4 check failure terminal E620 will be in its DOWN condition indicating that no error has been found in the relationship between the word and its indicator impressed on the 66 data line terminals.

*Numerical Example No. 2.*—For the conditions of Example No. 2, let us assume that a word and its indicator as shown in Figs. 2 and 3 of the drawing and labelled Example No. 2 is impressed on the 66 data line terminals. It will be noted that data line terminals DL1–1, DL1–2, DL1–4, DL2–1, DL2–8, DL3–2, DL5–2, DL5–8, DL6–4, DL7–1, DL7–2, DL7–4, DL8–1, DL9–1, DL9–4, DL10–2, DL10–4, DL11–2 DL12–1, DL12–8, DL13–1, DL13–2, DL14–1, DL15–1, DL15–4, DL16–2 and DL17–2 are each respectively in the UP condition under the conditions of Example No. 2, i.e., a binary 1 is present at each of the afore-recited terminals. The remaining data line terminals are in their respective DOWN condition under the conditions of Example No. 2, i.e., a binary 0 is present at each of the remaining terminals (in Example No. 2 terminal DL5–2 is UP erroneously, whereas in Example No. 1 said terminal is DOWN. This is the only difference between the conditions of Example Nos. 1 and 2).

From an inspection of the conditions of Example No. 2, it will be noted that in decimal position 5 there is a decimal value greater than 9, i.e., the presence of an 8 and 2 bit simultaneously. At this point a brief review of the functional operation of the digit check circuit represented by blocks 501 through 516 is in order. It will suffice to recall that if terminals 908 and 904 or 902 of the digit check circuit are UP simultaneously, output terminal 93 of the digit check circuit will be UP. Actually, this condition will occur only when a decimal value greater than 9 is present within a decimal position.

Now once again referring to the conditions of Example No. 2, and in particular, the fact that terminals DL5–2 and DL5–8 are simultaneously UP, it will be appreciated that as a result thereof output terminals 93 of digit check circuit 505 is UP. Since output terminal 93 of digit check circuit 505 is connected via lead 354 to input terminal 43C of OR circuit 520, output terminal 54 of said OR circuit will be UP. When terminal 54 of OR circuit 520 is UP, lead 418 and input terminal 154 of delay circuit 522 are also UP.

It will be seen that approximately one microsecond later, greater-than-9 check failure terminal E523 will be UP indicating an error; namely, the existence of a decimal value greater than 9 within one of the sixteen decimal positions.

Now it is to be recalled from the earlier discussion of the digit check circuit that terminal 95 thereof will be UP when either an 8 bit or a 4 bit are impressed on the input terminals thereof. Thus, under the conditions of Example No. 2, terminal 95 of each of the following digit check circuits will be in the UP condition: 501, 502, 505, 506, 507, 509, 510, 512, and 515.

Now noting the interconnection of the 1 bit and 2 bit terminals of the sixteen decimal positions, terminal 95 of digit check circuits 501 through 516 and the input terminals of binary adders 531 through 546, it will be appreciated that the following terminals are in their respective UP condition: input terminals 110, 111 and 112 and output terminals C123 and S116 of binary adder 531; input terminal 110 and 112 and output terminal C123 of binary adder 532; input terminal 111 and output terminal S116 of binary adder 533; input terminals 110 and 111 and output terminal C123 of binary adder 535; input terminal 110 and output terminal S116 of binary adder 536; input terminals 110, 111 and 112 and output terminals S116 and C123 of binary adder 537; input terminal 112 and output terminal S116 of binary adder 538; input terminals 110 and 112 and output terminal C123 of binary adder 539; input terminals 110 and 111 and output terminal C123 of binary adder 540; input terminal 111 and output terminal S116 of binary adder 541; input terminals 110 and 112 and output terminal C123 of binary adder 542; input terminals 111 and 112 and output terminal C123 of binary adder 543; input terminal 112 and output terminal S116 of binary adder 544; input terminals 110 and 112 and output terminal C123 of binary adder 545; and input terminal 111 and output terminal S116 of binary adder 546.

Still referring to Figs. 2 and 3 of the drawing, and observing in particular the connections between the output terminals of binary adders 531 through 546 and the input terminals of binary adders 550 through 561, it will be seen that the following terminals are in their respective UP condition under the conditions of Example No. 2: input terminals 110 and 112 and output terminals C123 of binary adder 550; input terminals 111 and 112 and output terminal C123 of binary adder 551; input terminal 110 and output terminal S116 of binary adder 552; input terminal 111 and output terminal S116 of binary adder 553; input terminals 111 and 112 and output terminal C123 of binary adder 554; input terminals 110 and 112 and output terminal C123 of binary adder 555; input terminal 111 and output terminal S116 of binary adder 556; input terminals 110 and 112 and output terminal C123 of binary adder 557; input terminal 111 and output terminal S116 of binary adder 558; input terminals 110 and 112 and output terminal C123 of binary adder 559; input terminal 112 and output terminal S116 of binary adder 560; and input terminal 111 and output terminal S116 of binary adder 561.

At this point, it is to be noted that although carry output terminals C123 of binary adders 551, 555, 557 and 559 are respectively in their UP condition under the conditions of Example No. 2, they have no effect on the remaining portion of the MODULO 4 checking circuit since said terminals are unconnected. As previously stated, terminal C123 of binary adders 551, 553, 555, 557, 559 and 561 are left unconnected because they respectively have a value of 4 and by being left unconnected accomplish a MODULO 4 operation.

Now taking cognizance of which output terminals of binary adders 550 through 561 are in the UP condition and connected through one microsecond delay circuits to the input terminals of binary adders 568, 572, 578, 583, 588 and 593, it will be apparent that the following terminals are respectively in their UP condition: input terminal 111 and output terminal S116 of binary adder 568; input terminal 112 and output terminal S116 of binary adder 572; input terminals 111 and 112 and output terminal C123 of binary adder 578; input terminals 110, 111 and 112 and output terminals S116 and C123 of binary adder 588; and input terminal 110 and output terminal S116 of binary adder 593. It will be noted that although carry output terminal C123 of binary adder 578 is in its UP condition, it is unconnected and thus performs a MODULO 4 operation.

Now referring to Figs. 4 and 5 of the drawing, it will be seen that each of the output terminals of binary adders 568, 572, 578, 583, 588 and 593, except terminals C123 of binary adders 572, 578, 583 and 593, are connected to a pair of input terminals of modified binary adders 596, 598, 602, 605, 607 and 609. For example, output terminal S116 of binary adder 568 is connected via lead 440 to input terminal 112 of binary adder 602 and via lead 440 to inverter circuit 603 and lead 441 to input terminal 112 of modified binary adder 605. Thus, under the conditions of Example No. 2 the following terminals of modified binary adders 596, 598, 602, 605, 607 and 609 are respectively in their UP condition: input terminals 111 and 112 and output terminal C123 of modified binary adder 598; input terminal 110, terminal 129 and output terminal S116 of modified binary adder 596; terminal 129 of modified binary adder 605; input terminals 110, 111 and 112 and output terminals S216 and C123 of modified binary adder 602; input terminal 112, terminal 129 and output terminal S216 of modified binary adder 609; and input terminals 110 and 111 and output terminal C123 of modified binary adder 607.

Still referring to Figs. 4 and 5 of the drawing and observing the interconnections between the output terminals of modified binary adders 596, 598, 602, 605, 607 and 609 and the input terminals of modified binary adders 616 and 617, it will be appreciated that the following terminals of modified binary adders 616 and 617 are respectively in their UP condition: input terminal 110, terminal 129 and output terminal S116 of modified binary adder 617; and input terminals 111 and 112 and output terminal C123 of modified binary adder 616.

It will be noted that terminal S216 of modified binary adder 616 is in the UP condition, whereas terminal S216 of modified binary adder 602 is in the UP condition under the conditions of Example No. 2. Since terminal S216 of modified binary adder 602 is in the UP condition and is connected via lead 466 to input terminal 43A of OR circuit 618, the output terminal of said OR circuit will be in its UP condition. Thus, one microsecond later (delay circuit 619) MODULO 4 check failure terminal E620 will be in its UP condition indicating that an error has been found in the relationship between the word and its indicator impressed on the sixty-six data line terminals.

*Brief summary.*—The operation of the novel checking circuit shown in Figs. 2, 3, 4 and 5 of the drawing will be briefly reviewed. The sixty-six data line terminals appearing across the top of Figs. 2 and 3 accept a multi-decimal position word and the word's indicator, i.e., indicated bit count. For each decimal position of a word there are four terminals; a 1 bit terminal, a 2 bit terminal, a 4 bit terminal and an 8 bit terminal (for example, with regard to decimal position "1" the terminals are labelled DL1–1, DL1–2, DL1–4 and DL1–8; the terminals of decimal positions 2 through 16 are correspondingly labelled). The data line terminals DL17–1 and DL17–2 respectively accept the 1 bit and 2 bit of the indicated bit count. Digit check circuits 501 through 516 respectively determine whether a decimal value greater than 9 is present (in binary-decimal notation) in decimal positions 1 through 16 of the multi-decimal position word. If a value greater than 9 exists within one or more decimal positions the digit check circuits corresponding to the decimal positions where a value greater than 9 exists will have their respective terminals 93 in the UP condition. When any terminal 93 of digit check circuits 501 through 516 is in its UP condition through the medium of OR circuit 520 or 521 and delay circuit 522, greater-than-9 check failure terminal E523 will be in the UP condition to indicate that an error exists. The error being the existence of a value greater than 9 within one or more decimal positions of the word under analysis.

The word expressed in modified binary-decimal notation (i.e., 4 and 8 bit combined) is impressed on a first group of binary adders, namely, binary adders 531 through 546. This first group of adders does not take into account the bit value of a binary "1" but merely performs binary addition to determine the number of binary 1's existing in the word (expressed in binary-decimal notation) impressed upon the data line terminals. The sum output terminals (terminals S116) of the first group of adders each have a value of "1" when in the UP condition, whereas the carry output terminals (terminals C123) of the first group of adders each have a value of "2" when in the UP condition. The output terminals, namely, the sum output terminals and the carry output terminals of the first group of adders are selectively connected to a second group of binary adders, namely, binary adders 550 through 561, i.e., the sum output terminals of the first group of binary adders which respectively have a value of "1" when in the UP condition are connected to the input terminals of binary adders 550, 552, 554, 556, 558 and 560 of said second group of binary adders and the carry output terminals of said first group of binary adders which respectively have a value of "2" when in the UP condition are connected to the input terminals of binary adders 551, 553, 555, 557, 559 and 561. It will be observed that data line terminal DL17–1 (representing the "1" bit of the indicated bit count) is connected to one of the input terminals of binary adder 560 and that data line terminal DL17–2 (representing the "2" bit of the indicated bit count) is connected to one of the input terminals of binary adder 561. It will be noted that one of the input terminals of binary adder 560 and one of the input terminals of binary adder 561 are respectively connected to a —35 volt potential, i.e., constantly in the DOWN condition thereby at all times failing to introduce a value other than 0 on the respective input terminals of binary adders 560 and 561. Each input terminal of binary adders 550, 552, 554, 556, 558 and 560 has a value of "1" when in the UP condition, whereas each input terminal of binary adders 551, 553, 555, 557, 559 and 561 has a value of "2" when in the UP condition. It follows then, that as to binary adders 550, 552, 554, 556, 558 and 560 each sum output terminal when in the UP condition represents the value "1" and each carry output terminal when in the UP condition represents the value "2" and that as to binary adders 551, 553, 555, 557, 559 and 561, each sum output terminal when in the UP condition represents the value "2" and each carry output terminal when in the UP condition represents the value "4." (It will be observed that the carry output terminal of each of the binary adders 551, 553, 555, 557, 559 and 561 is left unconnected since each of these terminals if in the UP condition has the value "4." This effectively performs the MODULO 4 operation.)

The output terminals of the second group of binary adders which respectively represent a value "1" when in the UP condition are connected through delay circuits 565, 566, 567, 585, 586 and 587 to the input terminals of binary adders 568 and 588 of a third group of binary adders. The third group of binary adders consist of binary adders 568, 572, 578, 583, 588 and 593. The output terminals of the second group of binary adders which respectively represent a value "2" when in the UP condition are connected through delay circuits 570, 571, 573, 575, 576, 577, 580, 581, 582, 590, 591 and 592 to the input terminals of binary adders 572, 578, 583 and 593 of the third group of binary adders. It follows that as to binary adders 568 and 588, respectively, the sum output terminal represents a value of "1" when in the UP condition and the carry output terminal represents a value "2" when in the UP condition. It also follows that as to binary adders 572, 578, 583 and 593, respectively, the sum output terminal represents the value "2" when in the UP condition and the carry output terminal represents the value "4" when in the UP condition. (It will be observed that a MODULO 4 operation is performed by the third group of binary adders by leaving unconnected, the carry output terminal of each of the binary adders 572, 578, 583 and 593.)

The output of the third group of binary adders is selectively connected directly to certain modified binary adders and through inverter circuits to other modified binary adders of a first group of modified binary adders. The first group of modified binary adders including modified binary adders 596, 598, 602, 605, 607 and 609. In brief, it will be observed that the sum output terminals of binary adders 588 and 568 of the third group of binary adders are directly connected to the input terminals of modified binary adder 605 and respectively through an inverter circuit to the input terminals of modified binary adder 602. In addition, it will be noted that one of the input terminals of modified binary adder 605 has a —35 volt potential impressed upon it and that one of the input terminals of modified binary adder 602 has a positive 10 volt potential impressed upon it. These constantly applied potentials accomplish the introduction of adding a value of "1." It will be observed that the output terminals of the third group of binary adders that respectively represent a value of "2" when in the UP condition are directly connected to modified binary adders 596 and 607, and respectively through delay circuits to the input terminals of modified binary adders 598 and 609.

The first group of modified binary adders has its output terminals selectively interconnected to terminals 129 of said first group of modified binary adders and to the input terminals of a second group of modified binary adders. The second group of modified binary adders consists of modified binary adders 616 and 617. In addition, it will be noted that the sum output terminal S116 of modified binary adder 602 is directly connected to one of the input terminals of OR circuit 618. The output terminals of the second group of modified binary adders are selectively interconnected to terminals 129 of said second group of modified binary adders and sum output terminal S116 of modified binary adder 616 is connected to the second input terminal of OR circuit 618. If either of the input terminals of OR circuit 618 is in the UP condition, an error or inconsistency between the multi-decimal position word and its indicator exists. When either of the input terminals of OR circuit 618 is UP MODULO 4 check failure terminal E602 will be UP indicating the error.

*Alternative embodiment.*—Fig. 9 discloses how Figs. 2, 3, 7 and 8 are combined to show a second circuit that may be employed to practice the invention herein disclosed. It will immediately be apparent that Figs. 2 and 3 are the same as a portion of the first embodiment disclosed in detail supra. The circuitry of Figs. 2 and 3 functions in identical manner in both embodiments and hence as to this alternative embodiment, only the circuitry of Figs. 7 and 8 will be explained.

Now referring to Figs. 7 and 8, and in particular the inputs of binary adders 1001 through 1006, the following will be noted: each of the inputs of binary adders 1003 and 1005 has a "1" value when in the UP condition; and each of the inputs of binary adders 1001, 1002, 1004 and 1006 has a value of "2" when in the UP condition. Now it will be apparent that each of the carry output terminals of binary adders 1001, 1002, 1004 and 1006 when in the UP condition manifests a value of "4." Thus the carry output terminals of the afore-recited binary adders are left unconnected and thereby respectively perform a MODULO 4 operation if in the UP condition.

Now still referring to Figs. 7 and 8 it will be seen that each of the input terminals of binary adders 1007 and 1009 will have a value of "2" when in the UP condition. Thus the carry output terminal of each of these binary adders is left unconnected. Further, it will be seen that each of the input terminals of binary adder 1008 has a value of "1" when in the UP condition. (It will be appreciated that the input terminal of binary adder 1008 which is connected to a potential of +10 volts effectively adds a "1" value.)

The input terminals of binary adder 1010 respectively represent a "2" value when in the UP condition, hence the carry output terminal of said binary adder is left unconnected.

If either, or both, of the sum output terminals of binary adders 1008 and 1010 are in the UP condition, an error exists. The error will result in either or both of the inputs of OR circuit 2000 being in the UP condition. Thus the output of said OR circuit, and terminal E620 will be in the UP condition if an error exists.

The greater-than-9 check is not discussed in conjunction with the embodiment shown in Figs. 2, 3, 7 and 8. The digit check, i.e., greater-than-9 check, is substantially the same for both embodiments. However, error terminal E523 is shown twice, once in Fig. 4 and again in Fig. 7, the only difference being the serial connection of delay circuit 522 shown in Fig. 4.

To briefly summarize, it will be seen that this second embodiment utilizes, in essence, binary adders in place of the modified binary adders and inverter circuits utilized in the first embodiment. Further, the second embodiment omits the delay circuits (reference nos. 565–592) of the first embodiment.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A checking circuit for determining whether a multi-decimal position word expressed in binary-decimal notation and the indicator of said word are in accord comprising, a plurality of groups of decimal position terminals, each group including a "1" bit terminal, a "2" bit terminal, a "4" bit terminal and an "8" bit terminal, digit check circuit means including a digit check circuit for each decimal position, means so interconnecting each digit check circuit with a corresponding group of decimal position terminals that the "2" bit, "4" bit and "8" bit values will be impressed on said digit check circuit, a first plurality of binary adders, means for connecting each binary adder of said first plurality of binary adders to a respective digit check circuit and the "1" bit and "2" bit decimal position terminals corresponding to said digit check circuit, a second group of binary adders, means connecting said first group of binary adders with said second group of binary adders, means for introducing the indicated bit count into the sum rendered by said second group of adders, delay means interconnecting the output of said second group of adders with a third group of adders, means including inverter circuit means connecting said third group of adders with a group of modified binary adders, and means responsive to the output of said group of modified binary adders for indicating whether or not the word and its indicated bit count are consistent.

2. A checking circuit for determining whether up to a sixteen decimal position word expressed in binary-decimal notation and the indicated bit count of said word are in accord comprising, sixteen groups of decimal position terminals each group including a "1" bit terminal, a "2" bit terminal, a "4" bit terminal and an "8" bit terminal, digit check circuit means including sixteen digit check circuits one for each decimal position, means so interconnecting each digit check circuit with a corresponding group of decimal position terminals that the "2" bit, "4" bit and "8" bit value will be impressed on said digit check circuit, sixteen binary adders, means for connecting each of said sixteen binary adders to a respective digit check circuit and "1" and "2" bit decimal position terminals corresponding to said digit check circuit, a group of twelve binary adders, means connecting the output of said sixteen binary adders to the input of said group of twelve binary adders, means for introducing the indicated bit count into the input of said group of twelve binary adders, delay circuit means selectively interconnecting the output of said group of twelve binary adders to the input of an additional group of six binary adders, means including inverter circuit means selectively interconnecting the output of said additional group of six binary adders to the input of a first group of six modified binary adders, means for introducing a value of "1" into the input of said first group of six modified binary adders, a second group of two modified binary adders selectively connected to said first group of modified binary adders, and means responsive to said first and second group of modified binary adders for indicating whether or not the word and its indicated bit count are consistent.

3. A checking circuit for determining whether or not a multi-decimal position word expressed in binary-decimal notation and the indicator of said word are in accord comprising, means for computing the bit count modulo 4 of said word, means for adding the indicated bit count and a "1" value to the the bit count modulo 4 to render a first sum, and means for indicating when said first sum is other than the value "4."

4. A checking circuit as claimed in claim 3 further characterized by said means for computing includes means for indicating when a decimal value greater than 9 exists in any one or more decimal positions of said word.

5. A checking circuit for determining whether a multi-decimal position word expressed in binary-decimal notation and an indicator related to said word are in accord, said checking circuit comprising: means for accepting an electrical manifestation representative of said multi-decimal position word expressed in binary-decimal notation; means for accepting an electrical manifestation of the indicator of said word; means for arithmetically combining the multi-decimal position word and its indicator; and means responsive to the immediately afore-recited means for indicating when said word and said word's indicator are not in accord.

6. A checking circuit for determining whether a multi-digit word expressed in binary-decimal notation and the multi-digit word's indicator are in accord, including digit check circuit means for indicating whether a decimal value greater than 9 is expressed in binary-decimal notation within any digit of said word, and a plurality of binary adders and modified binary adders for combining said multi-digit word and said word's indicator and indicating if they are in accord.

7. A checking circuit for determining whether or not a multi-decimal position word expressed in binary-decimal notation and the indicator of said word are in accord comprising, means for adding the indicator of said multi-decimal position word to the bit count modulo 4 of said multi-decimal position word to obtain a first sum, and means for adding a "1" value to said first sum to obtain a "4" value if said multi-decimal position word and said indicator are in accord.

8. A checking circuit as claimed in claim 7 further characterized by means responsive to the first and second recited means for indicating an inconsistency between the multi-decimal position word and its indicator.

9. In a checking circuit for determining the validity of a multi-decimal position word expressed in binary-decimal notation, digit check circuit means for indicating that an 8 bit and a 2 bit or an 8 bit and a 4 bit are present within one or more decimal positions of the word being checked, said digit check circuit means including a plurality of circuits each consisting of an AND and an OR circuit.

10. A circuit for checking the validity of a multi-decimal position word expressed in binary-decimal notation, a digit check circuit for each decimal position of said multi-decimal position word, each digit check circuit consisting of a first OR circuit, a second OR circuit for indicating the presence of a predetermined portion of a digit, an AND circuit and passive means interconnecting said AND and OR circuits to render an indication when a digit is of a predetermined magnitude.

11. In a checking circuit as claimed in claim 10 further characterized in that each digit check circuit includes a 2 bit input terminal, a 4 bit input terminal and an 8 bit input terminal, means coupling the input of said first OR circuit to said 2 bit and 4 bit terminals, means coupling the input of said second OR circuit to said 4 bit and 8 bit terminals, and means coupling said AND circuit to said 8 bit terminal and said first OR circuit whereby said AND circuit is operative to produce an output when the value of a digit represented by one or more of the 2, 4 or 8 bits is greater than 9.

12. A checking circuit for determining whether or not a multi-decimal position word expressed in binary-decimal notation and the indicator of said word are in accord comprising, a first group of binary adders for adding the binary 1's present in said multi-decimal position word and rendering a first sum; a second group of binary adders for accepting said first sum and the indicator of said multi-decimal position word and rendering a second sum; a third group of binary adders for accepting said second sum and rendering a third sum and modified binary adder means including inverter means for accepting said third sum and rendering an indication if said multi-decimal position word expressed in binary notation and the indicator of said word are not in accord.

13. A checking circuit for determining whether or not a multi-decimal position word expressed in binary-decimal notation and the indicator of said word are in accord comprising, a first group of binary adders, a second group of binary adders coupled to said first group of binary adders and in which half of said adders are capable of performing a modulo 4 operation, a third group of binary adders in which half of said adders are capable of performing a modulo 4 operation, delay circuit means coupling said second and third group of binary adders, means including inverter circuit means coupling said third group of binary adders to a group of modified binary adders and means responsive to said group of modified binary adders for rendering an indication when a multi-decimal position word and its indicator are not in accord.

14. A checking circuit for determining whether a multi-decimal position word expressed in binary-decimal notation and the indicated bit count of said word are in accord comprising, means for determining the number of binary 1's present in said word, means for adding the indicated bit count to the number of binary 1's present in said word, means for determining the modulo 4 of the sum of the indicated bit count and the number of binary 1's in said word, means for adding a "1" value to the modulo 4 of the sum of the indicated bit count and the number of binary 1's in said word to obtain a 4 value, and means indicating when said "4" value is obtained.

15. A digit check circuit for accepting a multi-decimal position word and the indicated bit count of said word and performing a mathematical operation to determine whether said word and said word's indicated bit count are in accord comprising, means for determining and indicating if a decimal value greater than 9 exists in binary-decimal notation within any one or more decimal positions of said word, means disregarding the bit value for determining the number of binary 1's present in said word expressed in binary-decimal notation, means for adding the indicated bit count to the number of binary 1's present in said word, means for determining the modulo 4 of the sum of the indicated bit count and the number of binary 1's in said word, and means for adding a "1" value to the modulo 4 of the sum of the indicated bit count and the number of binary 1's in said word.

16. A checking circuit as claimed in claim 15 further characterized in that a means is provided for indicating when the value obtained by said means for adding a "1" value to the modulo 4 of the sum is other than a "4" value.

17. In a checking circuit for determining the validity of a multi-decimal position word expressed in binary-decimal notation, digit check circuit means including a digit check circuit for each decimal position of said word, each digit check circuit having a "2" bit input terminal, a "4" bit input terminal, an "8" bit input terminal, a first output terminal responsive to the presence of an input on either said "4" bit terminal or said "8" bit terminal, and a second output terminal responsive to an input on either said "2" bit terminal and said "8" bit terminal or said "4" bit terminal and said "8" bit terminal.

18. A checking circuit for determining whether a word expressed in binary notation and the indicated bit count of said word are in accord comprising means for determining the number of binary 1's present in said word, means for adding the indicated bit count to the number of binary 1's present in said word, means for determining the modulo 4 of the sum of the indicated bit count and the number of binary 1's in said word, means for adding a "1" value to the modulo 4 of the sum of the indicated bit count and the number of binary 1's in said word to obtain a "4" value and means indicating when said "4" value is not obtained.

19. A checking circuit for determining whether a multi-digit word expressed in binary-decimal notation and the multi-digit word's indicator are in accord including, digit check circuit means for indicating whether a decimal value greater than 9 is expressed in binary-decimal notation within any digit of said word, and a plurality of binary-decimal adders for combining said multi-digit word and said word's indicator and indicating if they are in accord.

20. A checking circuit for determining whether a word expressed in binary notation and an indicator related to said word are in accord, comprising, means for receiving voltage representations of said word and its indicator simultaneously in parallel, means for producing voltage representations of the sum of the quantity of binary bits of said word and the value of said indicator, and means responsive to said voltage representations for indicating when said word and the indicator thereof are in accord.

References Cited in the file of this patent

UNITED STATES PATENTS

| | | |
|---|---|---|
| Re. 23,601 | Hamming et al. | Dec. 23, 1952 |
| 2,634,052 | Bloch | Apr. 7, 1953 |
| 2,653,996 | Wright | Sept. 29, 1953 |
| 2,674,727 | Spielberg | Apr. 6, 1954 |
| 2,684,199 | Starreveld | July 20, 1954 |
| 2,758,787 | Felker | Aug. 14, 1956 |
| 2,763,854 | Oliwa | Sept. 18, 1956 |
| 2,776,091 | Chenus | Jan. 1, 1957 |